United States Patent
Tsunekawa

(10) Patent No.: US 11,167,617 B2
(45) Date of Patent: Nov. 9, 2021

(54) STABILIZER DEVICE AND METHOD OF MANUFACTURING STABILIZER DEVICE

(71) Applicant: TOYOTA JIDOSHA KABUSHIKI KAISHA, Toyota (JP)

(72) Inventor: Hajime Tsunekawa, Aisai (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 57 days.

(21) Appl. No.: 16/686,986

(22) Filed: Nov. 18, 2019

(65) Prior Publication Data

US 2020/0164714 A1    May 28, 2020

(30) Foreign Application Priority Data

Nov. 28, 2018   (JP) .............................. JP2018-222145

(51) Int. Cl.
    B60G 21/055    (2006.01)
(52) U.S. Cl.
    CPC .. B60G 21/0551 (2013.01); *B60G 2204/1222* (2013.01); *B60G 2204/41* (2013.01); *B60G 2206/427* (2013.01); *B60G 2206/73* (2013.01); *B60G 2206/821* (2013.01)
(58) Field of Classification Search
    CPC ........ B60G 21/0551; B60G 2204/1222; B60G 2206/427; B60G 2206/821; B60G 2204/41; B60G 21/055
    See application file for complete search history.

(56) References Cited

U.S. PATENT DOCUMENTS

| 10,124,646 | B2 | 11/2018 | Higuchi et al. | |
|---|---|---|---|---|
| 2004/0070161 | A1* | 4/2004 | Fader ................. | B60G 21/0551 280/124.166 |
| 2011/0291377 | A1* | 12/2011 | Kato .................. | B60G 21/0551 280/124.107 |
| 2012/0299261 | A1* | 11/2012 | Nagai ....................... | F16F 1/16 280/124.107 |
| 2015/0008630 | A1* | 1/2015 | Ishimatsu .......... | B60G 21/0551 267/279 |
| 2016/0257178 | A1* | 9/2016 | Higuchi ............ | B29C 66/91411 |
| 2017/0080772 | A1* | 3/2017 | Matsumura ............. | F16F 1/373 |
| 2017/0203630 | A1* | 7/2017 | Seo ....................... | B60G 21/055 |
| 2018/0135715 | A1* | 5/2018 | Oniwa ....................... | F16F 1/16 |
| 2018/0186211 | A1* | 7/2018 | Uchida .............. | B60G 21/0551 |
| 2018/0245654 | A1* | 8/2018 | Akiyama .............. | F16F 1/3842 |

FOREIGN PATENT DOCUMENTS

| JP | H1047403 | A | * | 2/1998 |
|---|---|---|---|---|
| JP | 2008168756 | A | * | 7/2008 |
| JP | 2018-087010 | A | | 6/2018 |
| JP | 2019113153 | A | * | 7/2019 |

* cited by examiner

Primary Examiner — James A English
Assistant Examiner — Caitlin Anne Miller
(74) Attorney, Agent, or Firm — Sughrue Mion, PLLC

(57) ABSTRACT

Provided is a stabilizer device, including: a pair of bushes made of an elastic material, the pair of bushes having inner peripheral surfaces fixed at two different positions on a cylindrical outer peripheral surface of a stabilizer bar in a circumferential direction of the stabilizer bar, each having an arc sectional shape and being formed as members independent of each other; and at least one case made of one of a resin and a rubber, the at least one case having an inner peripheral surface fixed to an outer peripheral surface of a corresponding one of the bushes and having an arc sectional shape.

6 Claims, 16 Drawing Sheets

STABILIZER DEVICE AND METHOD OF MANUFACTURING STABILIZER DEVICE

BACKGROUND OF THE INVENTION

1. Field of the Invention

The present invention relates to a stabilizer device to be provided in a vehicle and a method of manufacturing a stabilizer device.

2. Description of the Related Art

FIG. 23 is a sectional view for illustrating an example of a stabilizer device 100. The stabilizer device 100 includes a stabilizer bar 101, a rubber bush 102, and a fixing bracket 103. The stabilizer bar 101 is made of a metal, and has a circular cross section. The rubber bush 102 is an integrally molded member, which is fixed to an outer peripheral surface of the stabilizer bar 101. The fixing bracket 103 is made of a metal, and is mounted to an outer peripheral surface of the rubber bush 102.

Part of a torsion portion of the stabilizer bar 101 corresponds to a supported portion 101a, which extends linearly in a width direction of a vehicle. The rubber bush 102 has a mounting hole 102a. The mounting hole 102a passes through the rubber bush 102 in the width direction, and has approximately the same diameter as that of an outer periphery surface of the supported portion 101a. An adhesive is applied onto an entire inner peripheral surface of the mounting hole 102a of the rubber bush 102, and the supported portion 101a is inserted into the mounting hole 102a to thereby mount the rubber bush 102 over the supported portion 101a.

When the rubber bush 102 is mounted over the supported portion 101a, a downward preload indicated by the arrow in FIG. 23 is applied to an upper end portion of the rubber bush 102 mounted over the supported portion 101a by a compressor (not shown) before the adhesive is hardened.

The fixing bracket 103 includes a mounting portion 103a and a pair of fixed portion 103b. The mounting portion 103a has a U-shaped cross section. The pair of fixed portions 103b extend from both ends of the mounting portion 103a in an approximately horizontal direction, respectively. After completion of the application of the preload on the rubber bush 102 by the compressor, the mounting portion 103a of the fixing bracket 103 is mounted to the supported portion 101a from above. The pair of fixed portions 103b of the fixing bracket 103 are placed on an upper surface of a stabilizing fixing portion 104. The fixed portions 103b of the fixing bracket 103 are fixed to the stabilizer fixing portion 104 with use of a pair of bolts 105 and a pair of weld nuts 106. Each of the bolts 105 passes through a corresponding one of the fixed portions 103b and the stabilizer fixing portion 104 from an upper side to a lower side. The pair of weld nuts 106 are fixed to a lower surface of the stabilizer fixing portion 104. The bolts 105 are threadably fitted into the weld nuts 106, respectively.

In order to firmly fix the entire inner peripheral surface of the mounting hole 102a of the rubber bush 102 to the outer peripheral surface of the supported portion 101a through the adhesive, the entire inner peripheral surface of the mounting hole 102a is required to be pressed in a direction orthogonal to the outer peripheral surface, specifically, in a radial direction of the supported portion 101a before the adhesive is hardened.

The preload applied by the compressor is a force in an up-and-down direction. Thus, a force in a direction orthogonal to a longitudinal direction of an upper end portion of the outer peripheral surface of the supported portion 101a is applied between an upper end portion of the rubber bush 102 and the upper end portion of the supported portion 101a. At the same time, a force in a direction orthogonal to a longitudinal direction of a lower end portion of the outer peripheral surface of the supported portion 101a is applied between a lower end portion of the rubber bush 102 and the lower end portion of the supported portion 101a. Accordingly, the upper end portion and the lower end portion of the inner peripheral surface of the mounting hole 102a are firmly fixed to the upper end portion and the lower end portion of the supported portion 101a, respectively.

Meanwhile, the rubber bush 102 is elastically deformed by the preload to have a diameter enlarged in the horizontal direction. Specifically, the rubber bush 102 is elastically deformed so that both of a right side portion and a left side portion of the inner peripheral surface of the mounting hole 102a are separated from both of a right side portion and a left side portion of the outer peripheral surface of the supported portion 101a to a radially outer side. Thus, there is a fear that both of the right and left side portions of the inner peripheral surface of the mounting hole 102a may not be firmly fixed to both of the right and left side portions of the supported portion 101a, respectively.

Further, the force in the up-and-down direction, which is generated due to the preload, is applied between regions of the inner peripheral surface of the mounting hole 102a excluding the upper end portion, the lower end portion, the right end portion, and the left end portion (hereinafter the regions are referred to as "remaining regions") and the outer peripheral surface of the supported portion 101a. However, directions orthogonal to regions of the outer peripheral surface of the supported portion 101a, which are opposed to the remaining regions, and the up-and-down direction do not match each other. Thus, there is a fear that the remaining regions of the inner peripheral surface of the mounting hole 102a may not be firmly fixed to the outer peripheral surface of the supported portion 101a.

SUMMARY OF THE INVENTION

The present invention has been made to cope with the problems described above. Specifically, one object of the present invention is to provide a stabilizer device and a method of manufacturing a stabilizer device, with which an entire inner peripheral surface of a rubber bush can be firmly fixed to an outer peripheral surface of a stabilizer bar through an adhesive.

A stabilizer device 10 and 10A according to one aspect of the present invention includes: a pair of bushes 26, 26A and 36 made of an elastic material, the pair of bushes 26, 26A and 36 having inner peripheral surfaces fixed at two different positions on a cylindrical outer peripheral surface of a stabilizer bar 15 thorough adhesive B in a circumferential direction of the stabilizer bar, each having an arc sectional shape and being formed as members independent of each other; and at least one case 21, 31, and 31A made of one of a resin and a rubber, the at least one case having an inner peripheral surface fixed to an outer peripheral surface of a corresponding one of the bushes 26, 26A, and 31A and having an arc sectional shape.

The term "arc shape" used in this specification includes meaning of "a perfect arc shape" and "an approximate arc shape".

The case has an arc sectional shape (the case is not a cylindrical member), and hence it is easy to deform the case in a suitable direction under a state in which the inner peripheral surface of each of the bushes is mounted to the outer peripheral surface of the stabilizer bar. For example, the case can be deformed so that each region of an outer peripheral surface of the case is pressed toward a center axis side of the stabilizer bar. When the case is deformed in the mode described above, the entire inner peripheral surface of the bush corresponding thereto, which is fixed to the case, is pressed against the outer peripheral surface of the stabilizer bar in a direction orthogonal to or approximately orthogonal to the outer peripheral surface of the stabilizer bar. Further, the inner peripheral surface of the case is fixed to the outer peripheral surface of the bush corresponding thereto. Thus, when the case is deformed, the bush does not slip with respect to the case corresponding thereto. Thus, a force applied to the outer peripheral surface of the case is reliably transmitted from the case to the bush corresponding thereto. Thus, the entire inner peripheral surface of the bush, which is pressed by the case corresponding thereto, is reliably fixed to the outer peripheral surface of the stabilizer bar through the adhesive.

The stabilizer according to one aspect of the present invention, further includes a pair of bush stoppers 23 and 33 provided on the inner peripheral surface of the at least one case so as to be separate from each other in a direction parallel to a center axis of the stabilizer bar, wherein the corresponding one of the bushes is positioned between the pair of bush stoppers 23 and 33.

According to one aspect of the present invention, when a force parallel to the center axis of the stabilizer bar is applied to the bushes, there is little fear of separation of the bush from the case corresponding thereto.

According to one aspect of the present invention, there is provided a pair of pressed projections 25 and 35 to be pressed by a pressing member 71, 73 and 73A, which are provided on both sides of a central portion of an outer peripheral surface of the at least one case in the circumferential direction so as to project radially out side.

According to one aspect of the present invention, the pair of pressed projections are pressed by the pressing member. As a result, the case is easily deformed. Thus, work of fixing the entire inner peripheral surface of the bush pressed by the case to the outer peripheral surface of the stabilizer bar through the adhesive can easily be executed.

According to one aspect of the present invention, there is provided a pair of brackets 40, 40A, 50, and 50A to be fixed to a vehicle body under a state of being fixed to each other, each of the pair of brackets corresponding to the bushes, a corresponding one of the brackets being mounted to an outer peripheral surface of the at least one case, in which recessed portions 45, 47, 50f, 55 and 57 are formed on an inner peripheral surface of the corresponding one of the brackets, which is mounted to the outer peripheral surface of the at least one case, and in which projecting portions 24, 25, 34, 35 and 37 to be fitted into the recessed portion are formed on the outer peripheral surface of the at least one case to which the corresponding one of the brackets is mounted.

According to one aspect of the present invention, rotation of the case about the stabilizer bar relative to the bracket corresponding to the case is restricted by the projecting portion and the recessed portion.

According to one aspect of the present invention, the corresponding one of the brackets 50A is mounted to the outer peripheral surface of the case fixed to the corresponding one of the bushes 36, and another one of the brackets 40A is directly fixed to another one of the bushes 26A.

According to one aspect of the present invention, the another one of the brackets and the another one of the bushes can be integrally molded.

According to one aspect of the present invention, the another one of the brackets is made of one of a resin and a rubber.

According to one aspect of the present invention, the another one of the brackets and the another one of the bushes can be more reliably fixed to each other.

According to the present invention, there is provided a method of manufacturing a stabilizer device 10 and 10A, including: preparing at least one case 21, 31, and 31A made of one of a resin and a rubber, a stabilizer device 10 and 10A having an arc sectional shape and having a smaller curvature than a curvature of a cylindrical outer peripheral surface of a stabilizer bar 15; forming a pair of bushes 26, 26A, and 36 made of an elastic material, each of the pair of bushes 26, 26A, and 36 having an arc-shaped sectional shape and being formed as members independent of each other so that an outer peripheral surface of a corresponding one of the bushes is fixed to an inner peripheral surface of the case; mounting inner peripheral surfaces of the pair of bushes to the outer peripheral surface of the stabilizer bar through an adhesive so that positions of the pair of bushes in a circumferential direction of the stabilizer bar are shifted from each other; pressing a central portion of the at least one case in the circumferential direction of the stabilizer bar with the use of a first pressing member 71, 73, and 73A in a direction of being brought closer to a center axis of the stabilizer bar; and moving a second pressing member 75, 80, and 80A brought into contact with two pressed portions Pepu being regions located on both sides of the central portion of the case in the circumferential direction of the stabilizer bar so as to be brought closer to the center axis of the stabilizer bar along a direction parallel to a direction of movement of the first pressing member to deform the two pressed portions to an radially inner side.

A sectional shape of the case is an arc shape having a curvature smaller than a curvature of the cylindrical outer peripheral surface of the stabilizer bar. Thus, under a state in which the inner peripheral surfaces of the bushes are mounted to the outer peripheral surface of the stabilizer bar, the case can easily be deformed in a suitable direction by the first pressing member and the second pressing member.

Specifically, the case can be deformed while the central portion of the case in the circumferential direction is pressed by the first pressing member in a direction of being brought closer to the center axis of the stabilize bar (hereinafter sometimes referred to as "approaching direction"), The approaching direction is orthogonal to or approximately orthogonal to a region of the outer peripheral surface of the stabilizer bar, which corresponds to the central portion of the case. Further, the inner peripheral surface of the case is fixed to the outer peripheral surface of the bush corresponding thereto. Thus, when the case is deformed, the bush does not slip with respect to the case corresponding thereto. Thus, the entire inner peripheral surface of the central portion of the bush can be reliably fixed to the outer peripheral surface of the stabilizer bar by the first pressing member.

Further, the second pressing member, which is brought into contact with the two pressed portions located on both sides of the central portion of the case, are moved in the approaching direction. Then, the two pressed portions of the case are deformed to a radially inner side. At the time of deformation, a direction of a force exerted on two regions located on both sides of the central portion of the bush from the second pressing member through the two pressed portions is orthogonal to or approximately orthogonal to the outer peripheral surface of the stabilizer bar. Thus, the entire inner peripheral surfaces of the two regions located on both sides of the central portion of the bush can be reliably fixed to the outer peripheral surface of the stabilizer bar by the second pressing member through the adhesive.

In the description given above, in order to facilitate understanding of the present invention, names and/or reference symbols in parentheses used in embodiments of the present invention described later are added to components of the invention corresponding to the embodiments. However, respective components of the present invention are not limited to the embodiments prescribed by the reference symbols. Other objects, other features, and accompanying advantages of the present invention can be readily understood from a description of the embodiments of the present invention provided referring to the accompanying drawings.

DESCRIPTION OF THE EMBODIMENT

Referring to the accompanying drawings, a stabilizer device and method of manufacturing stabilizer device according to embodiment of the present invention is described below.

Figure 1:
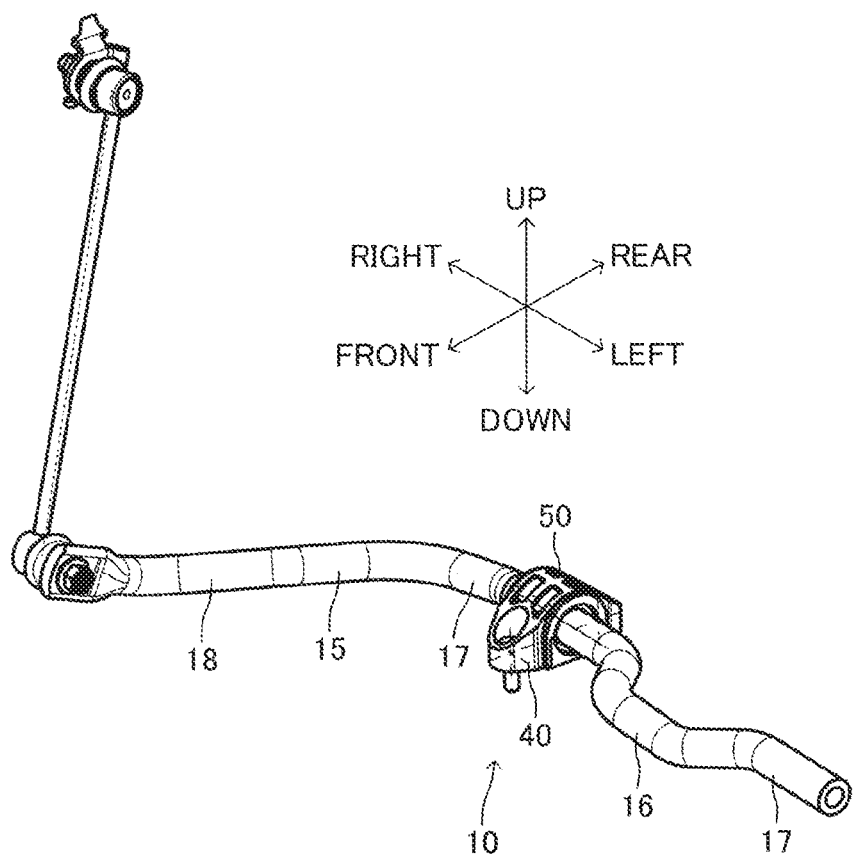
FIG. 1 is a perspective view of a stabilizer device according to an embodiment of the present invention.
Figure 2:
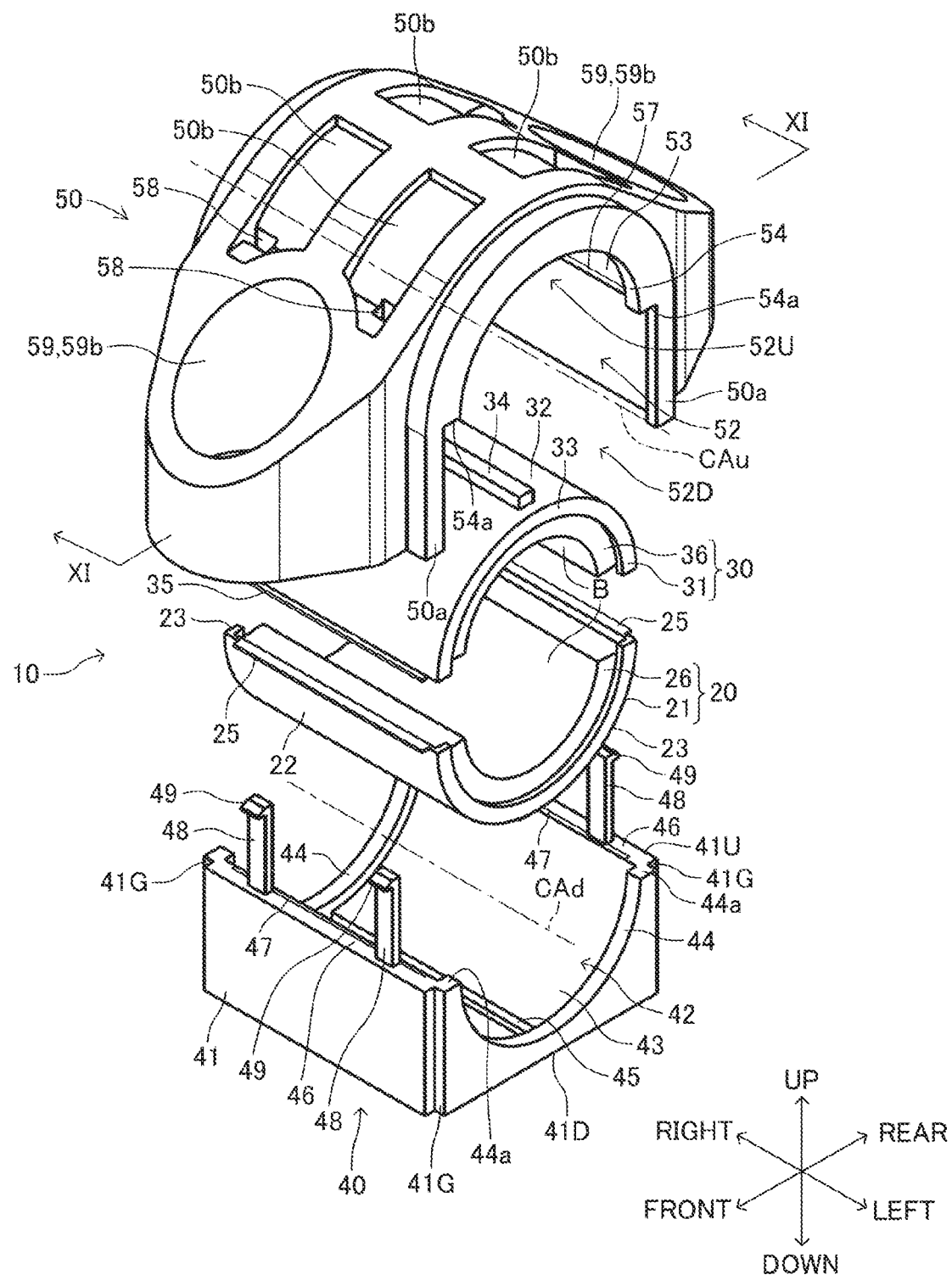
FIG. 2 is an exploded perspective view of a lower bush unit, an upper bush unit, a lower bracket, and an upper bracket according to the embodiment of the present invention.
Figure 3:
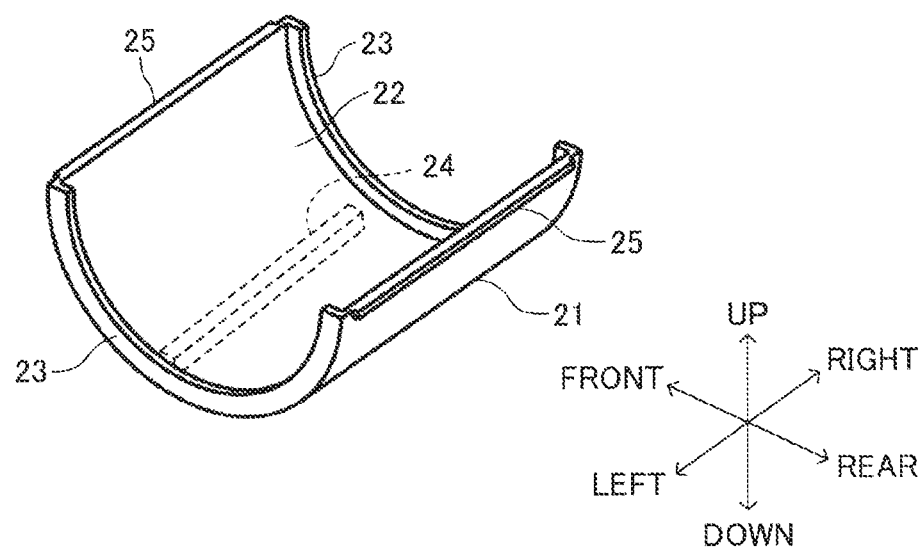
FIG. 3 is a perspective view of a lower case according to the present invention.

As illustrated in FIG. 1 and FIG. 2, a stabilizer device 10 according to an embodiment of the present invention includes, as main components, a stabilizer bar 15, a pair of right and left lower bush units 20, a pair of right and left upper bush units 30, a pair of right and left lower brackets 40, and a pair of right and left upper brackets 50. As described later, the stabilizer bar 15 includes a pair of right and left supported portions 17. In FIG. 1, however, the lower bush unit 20, the upper bush unit 30, the lower bracket 40, and the upper bracket 50 are mounted only to the right supported portion 17.

As illustrated in FIG. 1, the stabilizer bar 15 is a rod-shaped solid member made of a metal. The stabilizer bar 15 includes a torsion portion 16 and a pair of arm portions 18 (only a right one of the arm portions 18 is illustrated in FIG. 1). The torsion portion 16 extends in a vehicle width direction. The arm portions 18 extend forward from both of a right end portion and a left end portion of the torsion portion 16, respectively. The right end portion and the left end portion of the torsion portion 16 respectively correspond to the supported portions 17. The supported portions 17 each have an axial line extending in a right-and-left direction, and are coaxial with each other. Specifically, the whole stabilizer bar 15 has an approximately U-like planar shape. Further, a sectional shape of an outer peripheral surface of the stabilizer bar 15, which is taken along a direction orthogonal to an axial line of the stabilizer bar 15, is circular. In other words, the outer peripheral surface of the stabilizer bar 15 is a cylindrical surface having a center axis 17X illustrated in FIG. 6, FIG. 8, and FIG. 9 serving as a center.

The lower bush unit 20, the upper bush unit 30, the lower bracket 40, and the upper bracket 50 are mounted to each of the right and left supported portions 17.

As illustrated in FIG. 2 to FIG. 5, the lower bush unit 20 includes a lower case 21 and a lower bush 26.

The lower case 21 is an integrally molded member. The lower case 21 includes a main body portion 22, a pair of bush stoppers 23, a projection 24, and a pair of lower flange portions 25. The main body portion 22 has an arc-shaped cross section. The pair of bush stoppers 23 are provided to both of right and left end portions of an inner peripheral surface of the main body portion 22, and each have an arc shape. The projection 24, which extends in the right-and-left direction, is formed on a central portion of an outer peripheral surface of the main body portion 22 in a circumferential direction of the main body portion 22. The lower flange portions 25 are formed at both end portions of the main body portion 22 in the circumferential direction. The lower case 21 is made of a resin, and is manufactured of polyacetal (POM) or polyimide (PA). However, other materials may be used. An upper end surface of the main body portion 22, an upper end portion of each of the bush stoppers 23, and an upper surface of each of the lower flange portions 25 are flush with each other.

Before the lower case 21, specifically, the lower bush unit 20 is mounted to a corresponding one of the supported portions 17, the lower case 21 is placed in a free state. When the lower case 21 is in the free state, the lower case 21 is symmetrical in the right-and-left direction and in a front-and-rear direction. Further, when the lower case 21 is in the free state, a curvature of the main body portion 22 is smaller than a curvature of an outer peripheral surface of the supported portion 17. Specifically, a curvature radius of an inner peripheral surface of the main body portion 22 is larger than a curvature radius of the outer peripheral surface of the supported portion 17. Further, when the lower case 21 is in the free state, a central angle of the arc shape of the main body portion 22 is smaller than 180 degrees. Further, as illustrated in FIG. 3, FIG. 6, FIG. 9, and FIG. 15, the projection 24 has a prismatic shape. As illustrated in FIG. 10, a right end of the projection 24 is located on a left side of a right end of the main body portion 22. Although not shown, a left end of the projection 24 is located on a right side of a left end of the main body portion 22.

The lower bush 26 has an arc-shaped cross section. The lower bush 26 is vulcanized in a state of being fixed to the inner peripheral surface of the main body portion 22, an inner surface of the right bush stopper 23, and an inner surface of the left bush stopper 23 by insert molding that is performed under a state in which the lower case 21 is positioned inside a molding die (not shown). The lower bush 26 is manufactured of a styrene-butadiene rubber (SBR). However, the lower bush 26 may be manufactured of other rubbers such as a nitrile rubber (NBR).

Figure 4:
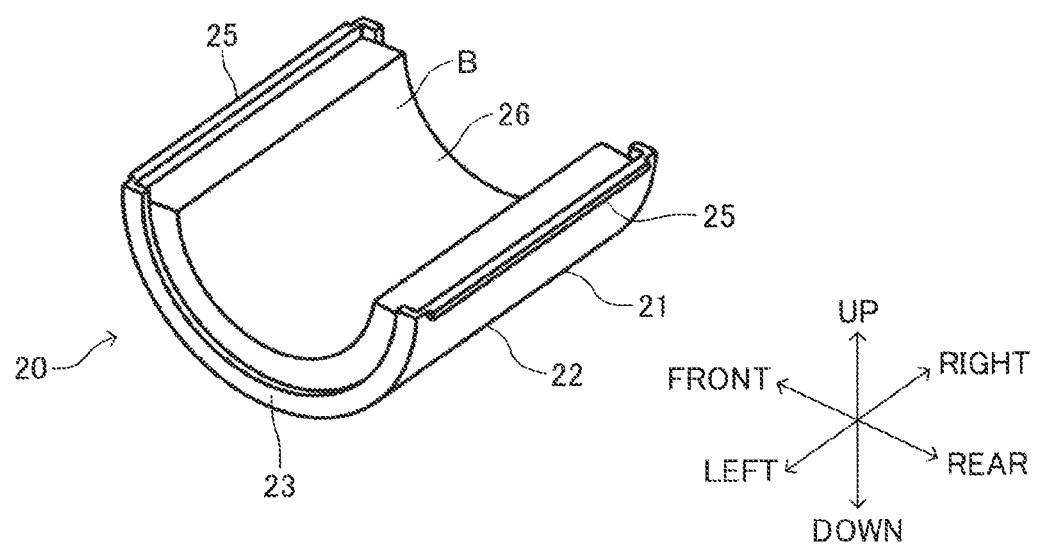
FIG. 4 is a perspective view of the lower bush unit according to the embodiment of the present invention.
Figure 5:
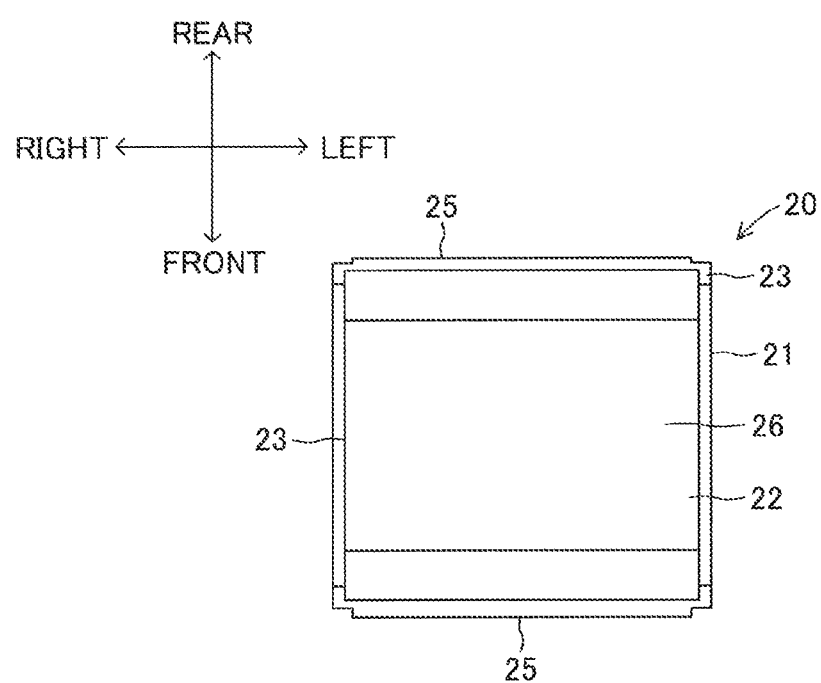
FIG. 5 is a plan view of the lower bush unit according to the embodiment of the present invention.

Before the lower bush 26, specifically, the lower bush unit 20 is mounted to a corresponding one of the supported portions 17, the lower bush 26 is placed in a free state. When the lower bush 26 is in the free state, a curvature of the lower bush 26 is smaller than the curvature of the outer peripheral surface of the supported portion 17. Further, when the lower bush 26 is in the free state, a central angle of the arc shape of the lower bush 26 is smaller than a central angle of the lower case 21. As illustrated in FIG. 4 and FIG. 5, a left end surface of a radially outer-side end portion of the lower bush 26 is fixed to an inner surface of the left bush stopper 23, and a right end surface of the radially outer-side end portion of the lower bush 26 is fixed to an inner surface of the right bush stopper 23. Thus, even when a strong force in the right-and-left direction is applied to the lower bush 26, there is little fear of separation of the lower bush 26 from the lower case 21 to the right side or the left side.

As illustrated in FIG. 2, the upper bush unit 30 includes an upper case 31 and an upper bush 36.

The upper case 31 is an integrally molded member made of a resin, which is symmetrical to the lower case 21 in an up-and-down direction. Specifically, the upper case 31 includes a main body portion 32, a pair of bush stoppers 33, a projection 34, and a pair of upper flange portions 35. The main body portion 32 corresponds to the main body portion 22. The pair of bush stoppers 33 correspond to the pair of bush stoppers 23. The projection 34 corresponds to the projection 24. The pair of upper flange portions 35 correspond to the pair of lower flange portions 25. The upper case 31 is manufactured of polyacetal (POM) or polyamide (PA). However, other materials may be used.

The upper bush 36 is symmetrical to the lower bush 26 in the up-and-down direction. The upper bush 36 has an arc-shaped cross section. The lower bush 26 is vulcanized in a state of being fixed to the inner peripheral surface of the main body portion 32, an inner surface of the right bush stopper 33, and an inner surface of the left bush stopper 33 by insert molding that is performed under a state in which the upper case 31 is positioned inside a molding die (not shown). The upper bush 36 is manufactured of a styrene-butadiene rubber (SBR). However, the upper bush 36 may be manufactured of other rubbers such as a nitrile rubber (NBR).

Figure 6:
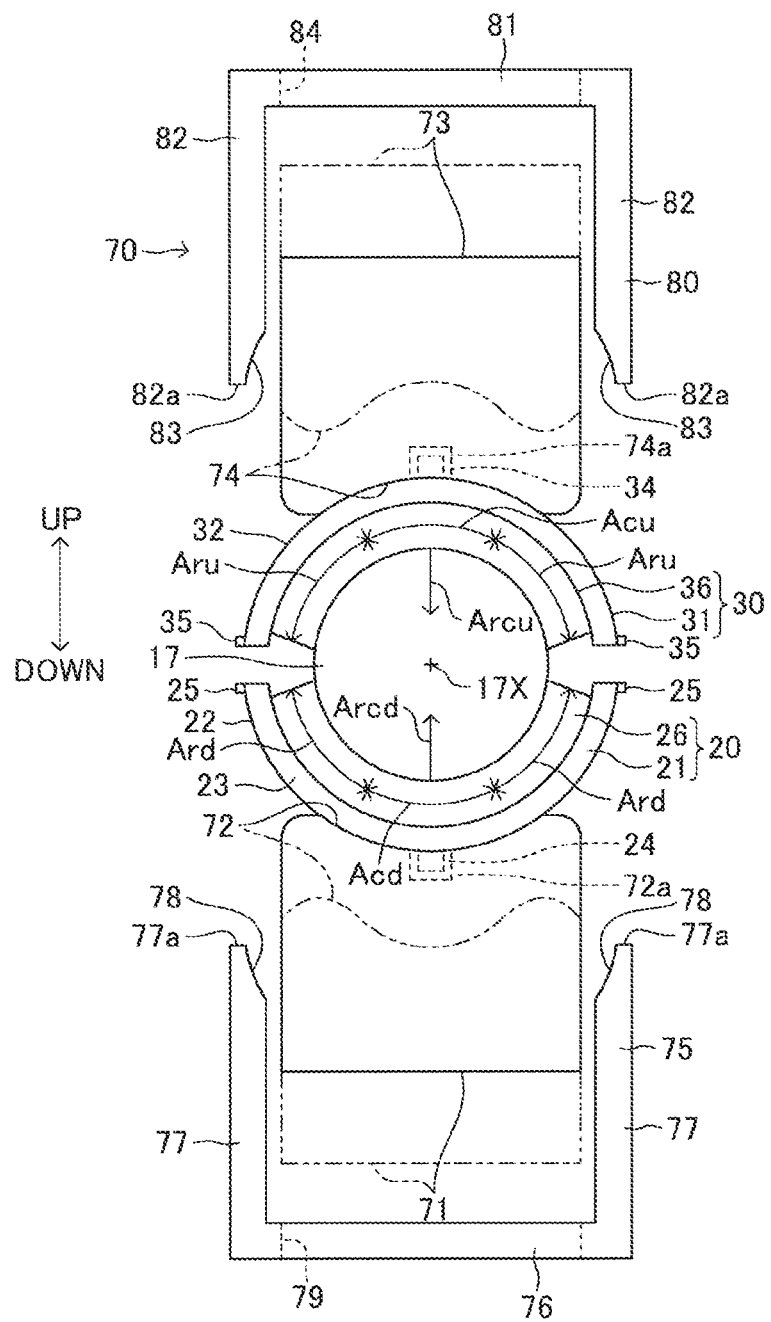
FIG. 6 is a schematic side view of a pressing device, the lower bush unit, the upper bush unit, the lower bracket, and the upper bracket according to the embodiment of the present invention.
Figure 7:
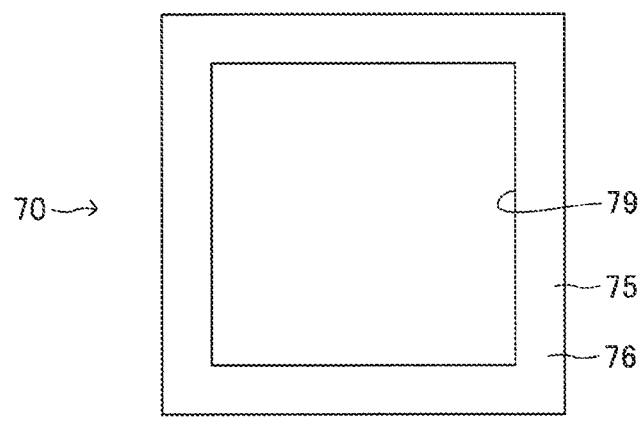
FIG. 7 is a bottom view of the second lower pressing member according to the embodiment of the present invention.
Figure 8:
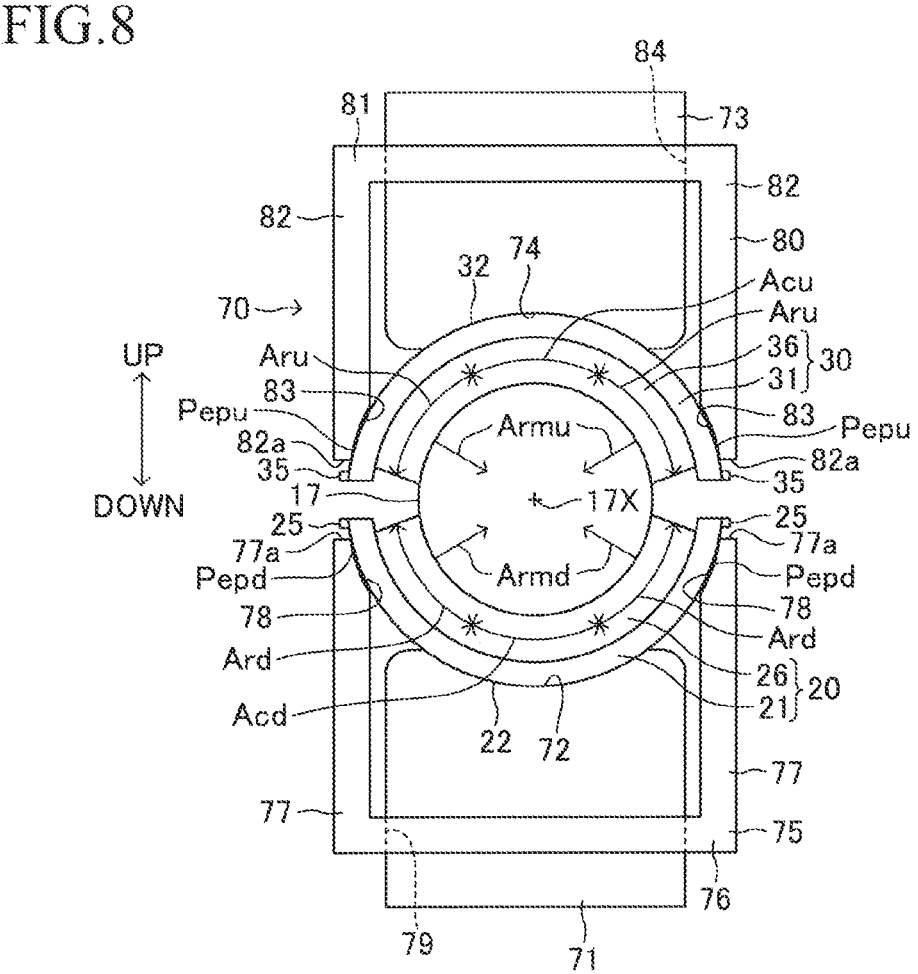
FIG. 8 is a side view similar to FIG. 6 when the second lower pressing member and a second upper pressing member according to the embodiment of the present invention are moved to contact start positions.
Figure 9:
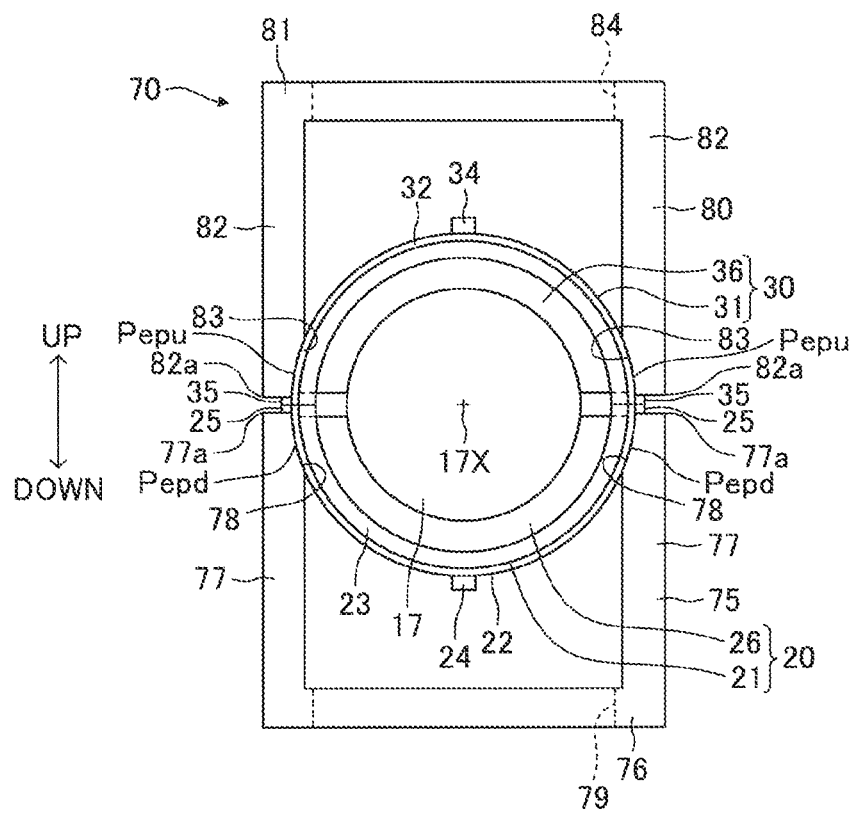
FIG. 9 is a side view similar to FIG. 6 when the second lower pressing member and the second upper pressing member according to the embodiment of the present invention are moved to pressing completion positions.
Figure 10:
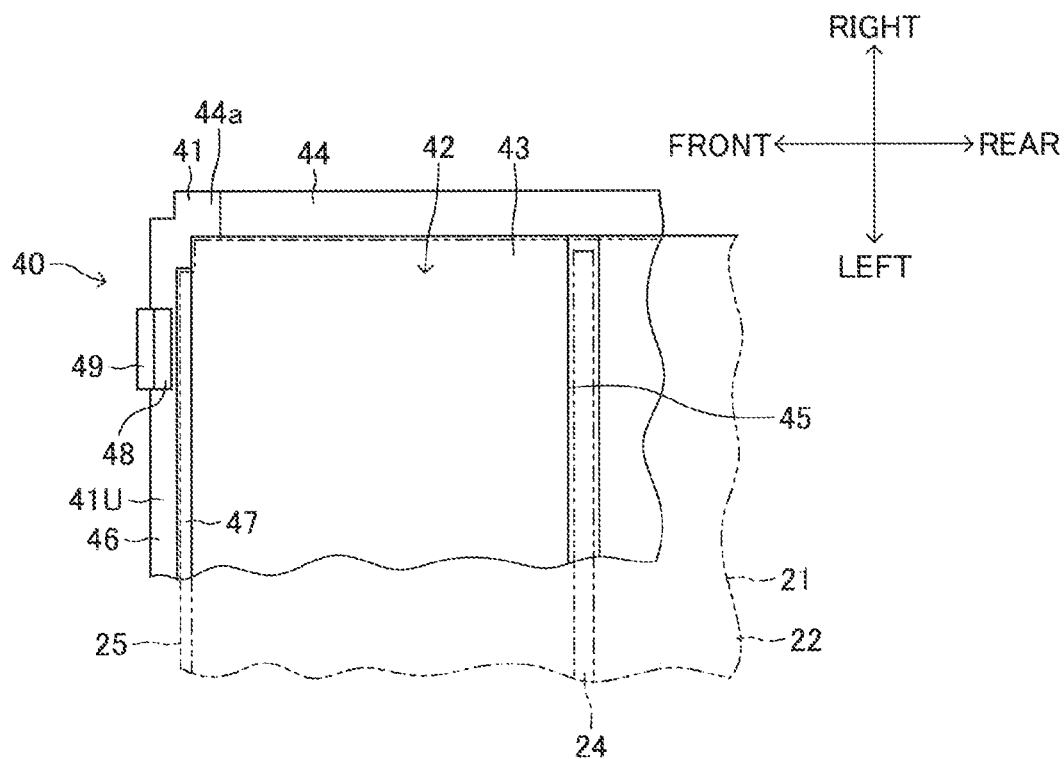
FIG. 10 is a plan view for illustrating part of the lower bracket and part of the lower case according to the embodiment of the present invention.

As illustrated in FIG. 6, FIG. 8, and FIG. 9, each of the right and left lower bush units 20 is mounted to a lower half of the outer peripheral surface of a corresponding one of the supported portions 17 through an adhesive B, and each of the right and left upper bush units 30 is mounted to an upper half of the outer peripheral surface of a corresponding one of the supported portions 17 through the adhesive B. Mounting work of the lower bush unit 20 and the upper bush unit 30 to a corresponding one of the supported portions 17 is carried out with use of a pressing device 70 illustrated in FIG. 6 to FIG. 9.

The pressing device 70 includes a first lower pressing member 71, a first upper pressing member 73, a second lower pressing member 75, and a second upper pressing member 80.

The first lower pressing member 71 and the first upper pressing member 73, which are both made of a metal, are symmetrical to each other in the up-and-down direction. The first upper pressing member 73 is located immediately above the first lower pressing member 71. The first lower pressing member 71 has an arc-shaped contact surface 72 as an upper surface, and the first upper pressing member 73 has an arc-shaped contact surface 74 as a lower surface. As illustrated in FIG. 6, in a central portion of the arc-shaped contact surface 72 in a circumferential direction thereof, a receiving recessed portion 72a having a dimension in the front-and-rear direction, a dimension in the right-and-left direction, and a dimension in the up-and-down direction, which are larger than those of the projection 24, is formed. Similarly, in a central portion of the arc-shaped contact surface 74 in a circumferential direction thereof, a receiving recessed portion 74a having a dimension in the front-and-rear direction, a dimension in the right-and-left direction, and a dimension in the up-and-down direction, which are larger than those of the projection 34, is formed. A curvature of each of the arc-shaped contact surface 72 and the arc-shaped contact surface 74 is approximately the same as the curvature of each of the main body portion 22 and the main body portion 32, which are placed in the free state. The first lower pressing member 71 and the first upper pressing member 73 are both movable by a first actuator (not shown) in the up-and-down direction.

The second lower pressing member 75 and the second upper pressing member 80, which are both made of a metal, are symmetrical to each other in the up-and-down direction. The second upper pressing member 80 is located immediately above the second lower pressing member 75. Further, the second lower pressing member 75 and the second upper pressing member 80 are coaxial with the first lower pressing member 71 and the first upper pressing member 73. The second lower pressing member 75 includes a base plate portion 76 and a pair of pressing pieces 77 extending upward from both side portions of the base plate portion 76. An upper end surface of each of the pressing pieces 77 serves as a pressing surface 77a, which is a horizontal surface. An arc-shaped contact surface 78 is formed at an upper end portion of an inner surface (opposing surface) of each of the right and left pressing pieces 77. A curvature of the arc-shaped contact surface 78 is approximately the same as the curvature of the outer peripheral surface of the main body portion 22 being in the free state. The base plate portion 76 has a slide hole 79 passing through the base plate portion 76 in the up-and-down direction. The slide hole 79 has approximately the same sectional shape as a sectional shape of the first lower pressing member 71. The second upper pressing member 80 includes a base plate portion 81 and a pair of pressing pieces 82. The base plate portion 81 corresponds to the base plate portion 76. The pair of pressing pieces 82 correspond to the pair of pressing pieces 77. A lower end surface of each of the pressing pieces 82 serves as a pressing surface 82a, which is a horizontal surface. Each of the pressing pieces 82 has an arc-shaped contact surface 83 corresponding to the arc-shaped contact surface 78. The base plate portion 81 has a slide hole 84 corresponding to the slide hole 79. The second lower pressing member 75 and the second upper pressing member 80 are both movable by a second actuator (not shown) in the up-and-down direction.

When the lower bush unit 20 and the upper bush unit 30 are mounted to a corresponding one of the supported portions 17, the second lower pressing member 75 and the second upper pressing member 80 are positioned in advance at initial positions illustrated in FIG. 6 by the second actuator. At the same time, the first lower pressing member 71 and the first upper pressing member 73 are positioned at initial positions indicated by imaginary lines in FIG. 6 by the first actuator.

Subsequently, the supported portion 17 is heated to a predetermined temperature, and the adhesive B is applied to the entire inner peripheral surface of the lower bush 26 and the entire inner peripheral surface of the upper bush 36. Then, as illustrated in FIG. 6, the entire inner peripheral surface of the lower bush 26 is mounted to the lower half of the outer peripheral surface of the supported portion 17 through the adhesive B, and the entire inner peripheral surface of the upper bush 36 is mounted to the upper half of the outer peripheral surface of the supported portion 17 through the adhesive B. At the time of mounting, as illustrated in FIG. 6, a position of the lower bush unit 20 and a position of the upper bush unit 30 are shifted from each other by 180 degrees or about 180 degrees in the circumferential direction of the supported portion 17. Then, the lower flange portions 25 of the lower bush unit 20 and the upper flange portions 35 of the upper bush unit 30 become parallel to each other. Thus, the lower flange portions 25 and the upper flange portions 35 are separate from each other in the up-and-down direction, and both end portions of the lower bush 26 in the circumferential direction and both end portions of the upper bush 36 in the circumferential direction are separate from each other in the up-and-down direction.

Subsequently, as illustrated in FIG. 6, while the lower flange portions 25 and the upper flange portions 35 are kept approximately horizontal, the outer peripheral surface of the main body portion 22 of the lower bush unit 20 integrated with the supported portion 17 is placed on the arc-shaped contact surface 72 of the first lower pressing member 71.

Further, the first lower pressing member 71 and the first upper pressing member 73 are moved by the first actuator to clamping positions indicated by the solid lines in FIG. 6 and are kept in the clamping positions. Then, the projection 24 of the lower case 21 is located in the receiving recessed portion 72a of the first lower pressing member 71, and the projection 34 of the upper case 31 is located in the receiving recessed portion 74a of the first upper pressing member 73. Further, the arc-shaped contact surface 72 of the first lower pressing member 71 presses up the central portion of the outer peripheral surface of the main body portion 22 in the circumferential direction, and the arc-shaped contact surface 74 of the first upper pressing member 73 presses down the central portion of the outer peripheral surface of the main body portion 32 in the circumferential direction. Then, an upward force indicated by the arrow Arcd is exerted from the arc-shaped contact surface 72 to the central portion of the outer peripheral surface of the main body portion 22 in the circumferential direction, and a downward force indicated by the arrow Arcu is exerted from the arc-shaped contact surface 74 to the central portion of the outer peripheral surface of the main body portion 32 in the circumferential direction.

The sectional shape of each of the lower case 21 and the upper case 31 is not circular and is an arc shape, and hence has a lower rigidity and is more elastically deformable as compared to a case in which the sectional shape is circular. Thus, the central portion of the lower case 21 is slightly elastically deformed by the force indicated by the arrow Arcd, and the central position of the upper case 31 is slightly elastically deformed by the force indicated by the arrow Arcu.

The lower case 21 is fixed to the lower bush 26. Thus, when the lower case 21 is elastically deformed, the lower bush 26 does not slip with respect to the lower case 21. Similarly, the upper case 31 is fixed to the upper bush 36, Thus, when the upper case 31 is elastically deformed, the upper bush 36 does not slip with respect to the upper case 31. Accordingly, when the lower case 21 is elastically deformed, the force in the direction indicated by the arrow Arcd is reliably transmitted from the lower case 21 to the lower bush 26. When the upper case 31 is elastically deformed, the force in the direction indicated by the arrow Arcu is reliably transmitted from the upper case 31 to the upper bush 36. Thus, a central portion Acd of the inner peripheral surface of the lower bush 26 in the circumferential direction is pressed against a lower end portion of the outer peripheral surface of the supported portion 17 and the vicinity thereof by the force in the direction indicated by the arrow Arcd. Similarly, a central portion Acu of the inner peripheral surface of the upper bush 36 in the circumferential direction is pressed against an upper end portion of the outer peripheral surface of the supported portion 17 and the vicinity thereof by the force in the direction indicated by the arrow Arcu.

Subsequently, under a state in which the first lower pressing member 71 and the first upper pressing member 73 are kept in the clamping positions, the second lower pressing member 75 and the second upper pressing member 80, which are positioned in the initial positions, are brought closer to each other by the second actuator. Then, as illustrated in FIG. 8, the first pressing member 71 is slidably fitted into the slide hole 79 of the base plate portion 76, and the first upper pressing member 73 is slidably fitted into the slide hole 84 of the second upper pressing member 80. When the second lower pressing member 75 and the second upper pressing member 80 are brought much closer to each other under the above-mentioned state, the second lower pressing member 75 and the second upper pressing member 80 are moved to contact start positions illustrated in FIG. 8. Then, the arc-shaped contact surfaces 78 of the second lower pressing member 75 are respectively brought into contact with two end vicinity portions Pepd of the outer peripheral surface of the main body portion 22, which are slightly separate from both end portions of the outer peripheral surface of the main body portion 22 in the circumferential direction toward the central portion side. Similarly, the arc-shaped contact surfaces 83 of the second upper pressing member 80 are respectively brought into contact with two end vicinity portions Pepu, which are slightly separate from both end portions of the outer peripheral surface of the main body portion 32 in the circumferential direction toward the central portion.

Under a state in which the first lower pressing member 71 and the first upper pressing member 73 are kept in the clamping portions, the second lower pressing member 75 and the second upper pressing member 80, which are positioned in the contact start positions, are brought much closer to each other by the second actuator. Then, while sliding upward on the end vicinity portions Pepd corresponding to the arc-shaped contact surfaces 78, the arc-shaped contact surfaces 78 press the end vicinity portions Pepd in directions indicated by the arrows Armd in FIG. 8 and directions approximately parallel to the directions indicated by the Armd. Further, while sliding downward on the end vicinity portions Pepu corresponding to the arc-shaped contact surfaces 83, the arc-shaped contact surfaces 83 of the second upper pressing member 80 press the end vicinity portions Pepu in the directions indicated by the arrows Armu in FIG. 8 and directions approximately parallel to the directions indicated by the Armu.

As described above, the lower case 21 and the upper case 31 are more elastically deformable as compared with the case in which each of the lower case 21 and the upper case 31 has a circular sectional shape. Further, the lower case 21 is fixed to the lower bush 26, and the upper case 31 is fixed to the upper bush 36. Thus, the whole lower case 21 is elastically deformed radially inner side by forces in the directions indicated by the arrows Armd, and the whole upper case 31 is elastically deformed radially inner side by forces in the directions indicated by the arrows Armu. As a result, the curvature of the lower case 21, specifically, the main body portion 22, the curvature of the lower bush 26 and the curvature of the upper case 31, specifically, the main body portion 32, and the curvature of the upper bush 36 become larger than those under the state illustrated in FIG. 6. Further, a pair of remaining regions Ard, which are regions of the inner peripheral surface of the lower bush 26 excluding the central portion Acd, are pressed against the outer peripheral surface of the supported portion 17 by the forces in the directions indicated by the arrows Armd and the forces in the directions approximately parallel to the directions indicated by the arrows Armd. Similarly, a pair of remaining regions Aru, which are regions of the inner peripheral surface of the upper bush 36 excluding the central portion Acu, are pressed against the outer peripheral surface of the supported portion 17 by the forces indicated by the arrows Armu and the forces in the directions approximately parallel to the directions indicated by the arrows Armu. The central angle of the lower case 21 is larger than the central angle of the arc shape of the lower bush 26, and the central angle of the upper case 31 is larger than the angle of the arc shape of the upper bush 36. Thus, at this time, the force is exerted from the lower case 21 on the pair of whole remaining regions Ard, and the force is exerted from the upper case 31 on the pair of whole remaining regions Aru. As a result, each of the lower bush 26 and the upper bush 36 is elastically deformed in a direction in which a circumferential length of each of the lower bush 26 and the upper bush 36 is extended.

Under a state in which the first lower pressing member 71 and the first upper pressing member 73 are kept in the clamping positions, the second lower pressing member 75 and the second upper pressing member 80 are brought much closer to each other by the second actuator. Then, the upper end surfaces 77a of the pressing pieces 77 are moved upward while pressing up the lower flange portions 25 corresponding thereto, and the pressing surfaces 82a of the pressing pieces 82 are moved downward while pressing down the upper flange portions 35 corresponding thereto. Then, after the second lower pressing member 75 and the second upper pressing member 80 are moved to pressing completion positions illustrated in FIG. 9, the second actuator keeps the second lower pressing member 75 and the second upper pressing member 80 in the pressing completion positions.

As described above, after the second lower pressing member 75 and the second upper pressing member 80 are moved from the contact start positions to the pressing completion positions, the whole arc-shaped contact surfaces 78 are brought into surface contact with the end vicinity portions Pepd to further press the end vicinity portions Pepd in the directions indicated by the arrows Armd and the directions approximately parallel to the directions indicated by the arrows Armd. Further, the whole arc-shaped contact surfaces 83 are brought into surface contact with the end vicinity portions Pepu to further press the end vicinity portions Pepu in the directions indicated by the arrows Armu and the directions approximately parallel to the directions indicated by the arrows Armu. Then, the curvature of the lower case 21, specifically, the main body portion 22, the curvature of the lower bush 26, the curvature of the upper case 31, specifically, the main body portion 32, and the curvature of the upper bush 36 become larger than those under a state illustrated in FIG. 8. Further, the lower flange portions 25 and the upper flange portions 35 corresponding thereto are brought into contact with each other. Further, each of the lower bush 26 and the upper bush 36 is elastically deformed in such a direction that the circumferential length thereof is increased as compared to that under the state illustrated in FIG. 8. However, in an initial state before pressing is performed by the pressing device 70, the central angle of the arc shape of the lower bush 26 is smaller than the central angle of the lower case 21, and the central angle of the arc shape of the upper bush 36 is smaller than the central angle of the upper case 31. Thus, end portions of the elastically deformed lower bush 26 in the circumferential direction and end portions of the elastically deformed upper bush 36 in the circumferential direction do not come into contact with each other. Specifically, contact between the lower flange portions 25 and the upper flange portions 35 corresponding thereto is not hindered by the lower bush 26 and the upper bush 36.

A direction orthogonal to the lower end portion of the outer peripheral surface of the supported portion 17 and the vicinity portion thereof is parallel to or approximately parallel to the direction indicated by the arrow Arcd, and a direction orthogonal to the upper end portion of the outer peripheral surface of the supported portion 17 and the vicinity portion thereof is parallel to or approximately parallel to the direction indicated by the arrow Arcu. Thus, after the first lower pressing member 71 and the first upper pressing member 73 are kept in the clamping positions by the first actuator until the adhesive B is hardened, the central portion Acd of the inner peripheral surface of the lower bush 26 is firmly fixed to the lower end portion of the outer peripheral surface of the supported portion 17 and the vicinity thereof through the adhesive B. Similarly, the central portion Acu of the inner peripheral surface of the upper bush 36 is firmly fixed to the upper end portion of the outer peripheral surface of the supported portion 17 and the vicinity thereof.

Further, directions orthogonal to the regions of the outer peripheral surface of the supported portion 17, which are respectively opposed to the remaining regions Ard, are parallel to or approximately parallel to the directions indicated by the arrows Armd, and directions orthogonal to the regions of the outer peripheral surface of the supported portion 17, which are respectively opposed to the remaining regions Aru, are parallel to or approximately parallel to the directions indicated by the arrows Armu. Thus, after the second lower pressing member 75 and the second upper pressing member 80 are kept in the pressing completion positions until the adhesive B is hardened, the two remaining regions Aid of the lower bush 26 are firmly fixed to "two regions of the outer peripheral surface of the supported portion 17, which are opposed to the remaining regions Ard" through the adhesive B. Similarly, the two remaining regions Aru of the upper bush 36 are firmly fixed to "two regions of the outer peripheral surface of the supported portion 17, which are opposed to the remaining regions Aru" through the adhesive B.

After elapse of sufficient time to harden the adhesive B, the first lower pressing member 71 and the first upper pressing member 73 are returned to the initial positions by the first actuator, and the second lower pressing member 75 and the second upper pressing member 80 are returned to the initial positions by the second actuator. Then, a worker extracts the stabilizer bar 15, the lower bush unit 20, and the upper bush unit 30, which are integrated with each other, from the pressing device 70. Then, the lower case 21 and the upper case 31 attempt to elastically return to initial shapes. Therefore, the curvature of the lower case 21 and the curvature of the upper case 31 become slightly smaller than the curvatures thereof under the state illustrated in FIG. 9. At the same time, minute gaps, for example, gaps smaller than gaps between the lower flange portions 25 and the upper flange portions 35, which are illustrated in FIG. 8, are formed between the lower flange portions 25 and the upper flange portions 35 corresponding thereto.

The lower bracket 40 and the upper bracket 50, which are illustrated in FIG. 2 and FIG. 10 to FIG. 16, are mounted to the stabilizer bar 15, the lower bush unit 20, and the upper bush unit 30, which are integrated with each other.

The lower bracket 40 illustrated in FIG. 2, FIG. 10 and FIG. 13 to FIG. 16 is the integrally molded member, which is symmetrical in the front-and-rear direction and in the right-and-left direction. The lower bracket 40 is manufactured of a metal, for example, aluminum. The lower bracket 40 may be made of resin or rubber. A bottom surface 41D and an upper surface 41U of a main body portion 41 of the lower bracket 40 are flat surfaces parallel to each other. The main body portion 41 has a hollow boxy shape. A planar shape of the lower bracket 40 is approximately rectangular. Fitting grooves 41G, each extending in the up-and-down direction, are formed at four corners of the lower bracket 40. A recessed groove 42 having an approximately semi-columnar shape, is formed in the upper surface 41U. An inner peripheral surface 43 of the recessed groove 42 is part of a cylindrical surface having a center axis CAd illustrated in FIG. 2. The center axis CAd is located on the same plane as the upper surface 41U. A center axis of the inner peripheral surface 43 having the center axis CAd as the center is 180 degrees, and a curvature of the inner peripheral surface 43 is approximately the same as the curvature of the outer peripheral surface of the main body portion 22 of the lower bush unit 20 integrated with the supported portion 17. Case stoppers 44, which are located on both of a right side and a left side of the inner peripheral surface 43 and each have an arc sectional shape with the center axis CAd as the center, are formed on the lower bracket 40. A diameter of an inner peripheral surface of each of the case stoppers 44 is smaller than a diameter of the inner peripheral surface 43. Further, a rotation restricting groove 45 extending in the right-and-left direction is formed in a central portion (lower end portion) of the inner peripheral surface 43 in the circumferential direction. A sectional shape of the rotation restricting groove 45, which is taken along a direction orthogonal to the right-and-left direction, is approximately the same as the sectional shape of the projection 24.

Figure 15:
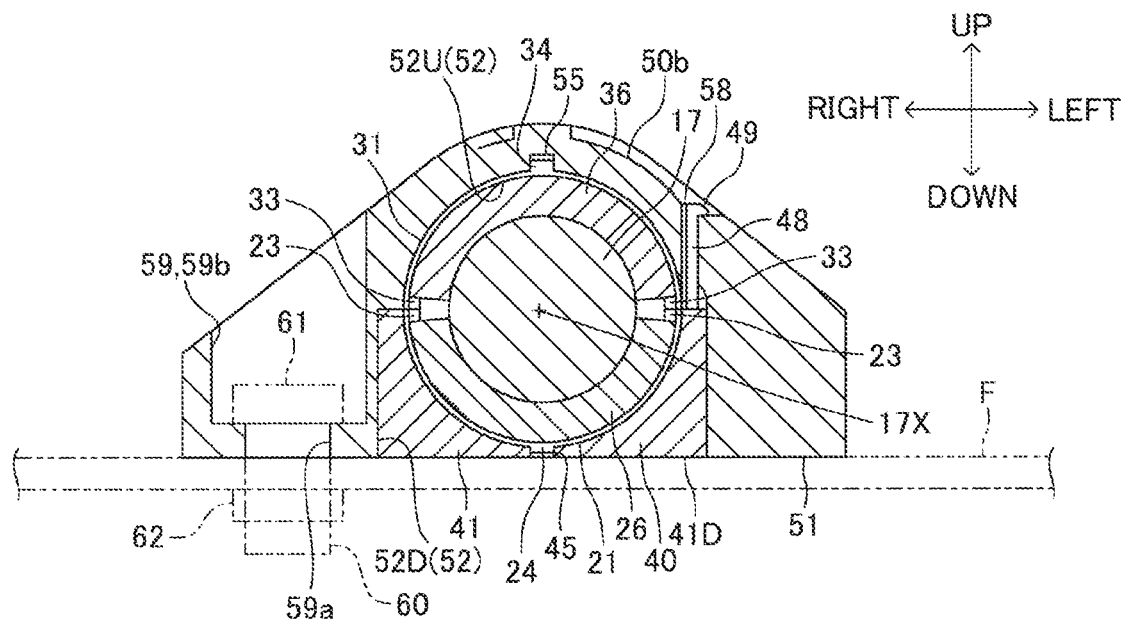
FIG. 15 is a sectional view of the lower bush unit, the upper bush unit, the lower bracket, and the upper bracket, which is taken along the arrow line XV-XV of FIG. 14.
Figure 16:
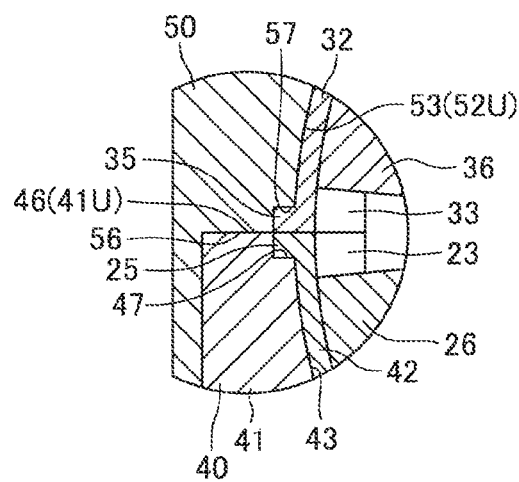
FIG. 16 is an enlarged view of part of FIG. 15.

As illustrated in FIG. 2 and FIG. 10, the upper surface 41U has a pair of clamping surfaces 46 on the front side and the rear side. Each of front and rear upper end surfaces 44a of each of the case stoppers 44 is continuous with a corresponding one of the clamping surfaces 46. A flange receiving groove 47 having a smaller length in the right-and-left direction than a length of the inner peripheral surface 43, specifically, a length of the rotation restricting groove 45 in the right-and-left direction, is formed at an opposing edge portion of each of the clamping surfaces 46 on the front side and the rear side. As illustrated in FIG. 16, a sectional shape of each of the flange receiving grooves 47, which is taken along a direction orthogonal to the right-and-left direction, is approximately the same as the sectional shape of a corresponding one of the lower flange portions 25. Further, as illustrated in FIG. 2 and FIG. 15, two elastic pieces 48 are provided to each of the clamping surfaces 46 on the front side and the rear side so as to avoid the flange receiving groove 47. The elastic pieces 48 extends upward from the clamping surface 46. An engagement claw 49 is formed at an upper end portion of each of the elastic pieces 48.

Figure 11:
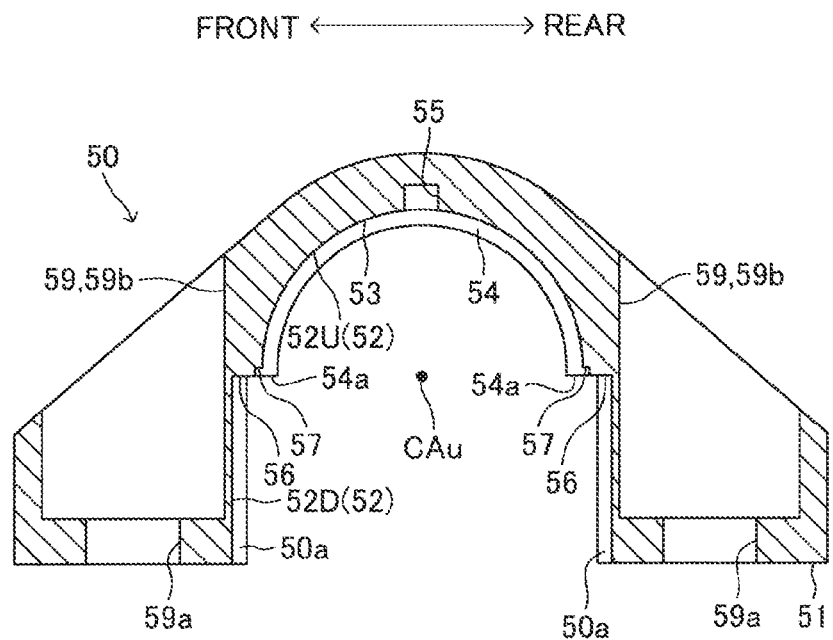
FIG. 11 is a sectional view of the upper bracket, which is taken along the arrow line XI-XI of FIG. 2.
Figure 12:
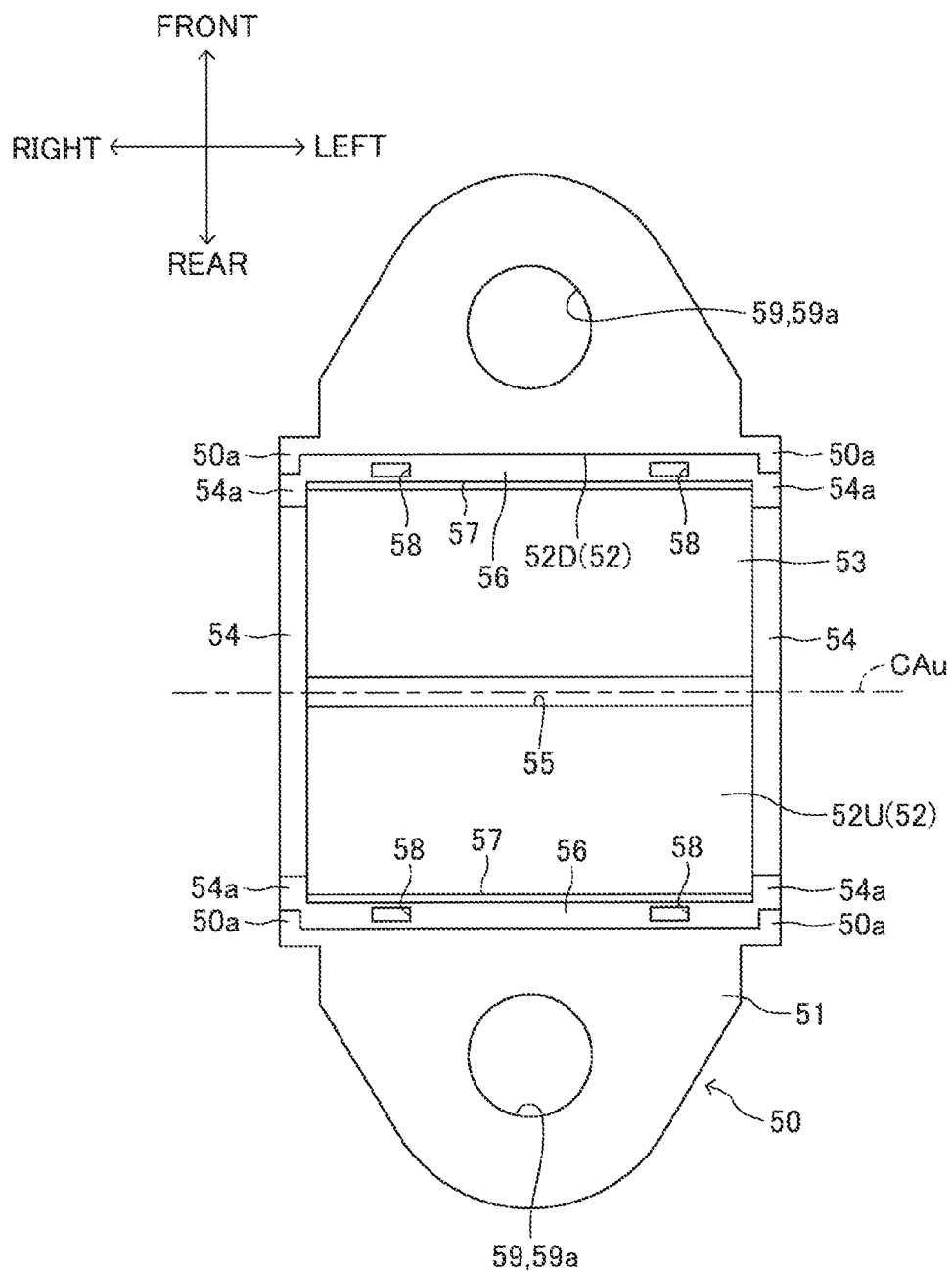
FIG. 12 is a bottom view of the upper bracket according to the embodiment of the present invention.

The upper bracket 50 illustrated in FIG. 2 and FIG. 11 to FIG. 16 is an integrally molded member, which is symmetrical in the front-and-rear direction and the right-and-left direction. The upper bracket 50 is manufactured of a resin, a rubber, or a metal. When the lower bracket 40 is made of a resin, it is preferred that the upper bracket 50 be manufactured of the same resin as that used for the lower bracket 40. Similarly, when the lower bracket 40 is made of a metal, it is preferred that the upper bracket 50 be manufactured of the same metal as that used for the lower bracket 40. Similarly, when the lower bracket 40 is made of a rubber, it is preferred that the upper bracket 50 be manufactured of the same rubber as that used for the lower bracket 40. As illustrated in FIG. 11 and FIG. 15, a bottom surface 51 of the upper bracket 50 is a flat surface. As illustrated in FIG. 2, FIG. 11, and FIG. 12, a recessed groove 52 is formed in the bottom surface 51. The recessed groove 52 has a lower groove 52D for forming a lower part thereof and an upper groove 52U for forming an upper part thereof. The lower groove 52D has an approximately rectangular parallelepiped shape. The approximately cuboidal shape of the lower groove 52D is approximately the same as the shape of the main body portion 41 of the lower bracket 40. Meanwhile, the upper groove 52U has an approximately semi-cylindrical shape, which is symmetrical to the recessed groove 42 in the up-and-down direction. Specifically, an inner peripheral surface 53 of the upper groove 52U is part of a cylindrical surface having a center axis CAu illustrated in FIG. 2 and FIG. 11 as a center. A central angle of the inner peripheral surface 53 about the center axis CAu is 180 degrees, and a curvature of the inner peripheral surface 52 is approximately the same as the curvature of the main body portion 32 of the upper case 31 of the upper bush unit 30 integrated with the supported portion 17.

The upper bracket 50 has case stoppers 54, each having an arc shape. The case stoppers 54 are located on both of a right side and a left side of the upper groove 52U, and each have the center axis CAu as a center. A diameter of an inner peripheral surface of each of the case stoppers 54 is the same as the diameter of the inner peripheral surface of each of the case stoppers 44 and smaller than a diameter of the inner peripheral surface 53. Further, as illustrated in FIG. 11, FIG. 12, and FIG. 15, a rotation restricting groove 55 extending in the right-and-left direction is formed in a central portion (upper end portion) of the inner peripheral surface 53 in the circumferential direction. A sectional shape of the rotation restricting groove 55, which is taken along a direction orthogonal to the right-and-left direction, is approximately the same as that of the projection 34.

As illustrated in FIG. 11 and FIG. 12, the lower groove 52D has upper end surfaces corresponding to a pair of front and rear clamping surfaces 56. The clamping surfaces 56 are flat surfaces, which are orthogonal to the up-and-down direction. The front and rear clamping surfaces 56 extend substantially in the right-and-left direction when viewed from below. Each of lower end surfaces 54a of each of the right and left case stoppers 54, which are located on the front side and the rear side, is continuous with a corresponding one of the clamping surfaces 56.

Further, as illustrated in FIG. 2, FIG. 11, and FIG. 12, a pair of front and rear fitting protrusions 50a are formed on each of a right side portion and a left side portion of the upper bracket 50. The pair of fitting protrusions 50a are located on each of a front side and a rear side of the lower groove 52D. Each of the fitting protrusions 50a extends in the up-and-down direction. A length of each of the fitting protrusions 50a in the up-and-down direction is approximately the same as that of each of the fitting grooves 41G of the lower bracket 40. A sectional shape of each of the fitting protrusions 50a, which is taken along a horizontal plane, is approximately the same as that of each of the fitting grooves 41G.

Further, as illustrated in FIG. 2 and FIG. 13 to FIG. 15, lightning portions 50b, each having an approximately rectangular shape in plan view, are formed at four positions on an upper surface of the upper bracket 50. Further, a vertical groove 58 passing through the upper bracket 50 in the up-and-down direction is formed in a bottom surface of each of the lightning portions 50b. As illustrated in FIG. 12, a lower end of the vertical groove 58 has an opening on the clamping surface 56.

Further, as illustrated in FIG. 2 and FIG. 11 to FIG. 14, bolt holes 59, which pass through the upper bracket 50 in the up-and-down direction, are formed at two positions in the upper bracket 50. Each of the bolt holes 59 has a small-diameter portion 59a and a large-diameter portion 59b. The small-diameter portion 59a has a circular cross section and forms a lower part of the bolt hole 59. The large-diameter portion 59b has a circular cross section and forms an upper part of the bolt hole 59. The small-diameter portion 59a and the large-diameter portion 59b are coaxial with each other, and a diameter of the small-diameter portion 59a is smaller than a diameter of the large-diameter portion 59b.

Figure 13:
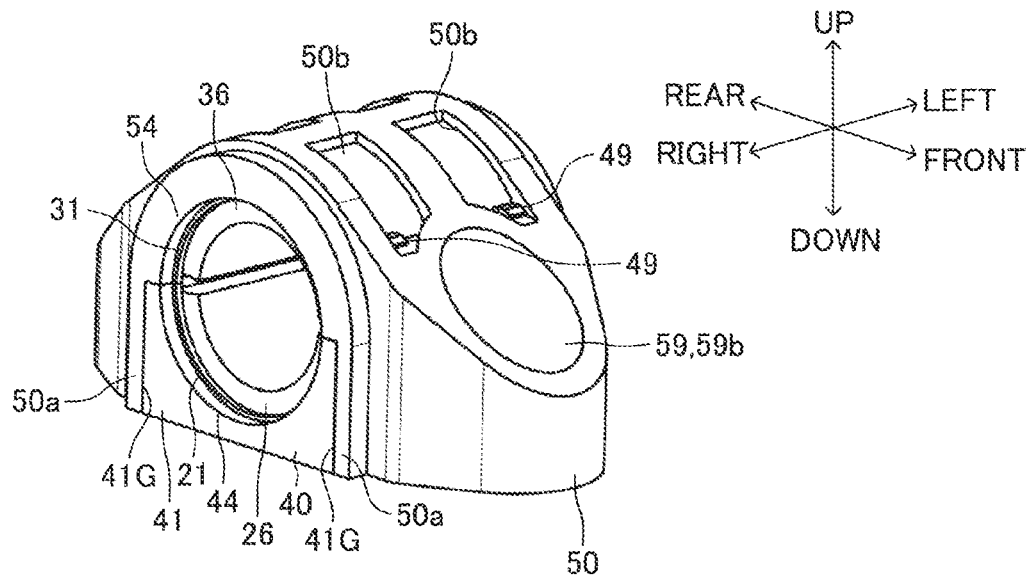
FIG. 13 is a perspective view of the lower bush unit, the upper bush unit, the lower bracket, and the upper bracket according to the embodiment of the present invention, which are in an assembled state.

When the lower bracket 40 and the upper bracket 50 are mounted to the lower bush unit 20 and the upper bush unit 30, which are integrated with the supported portion 17, the lower bush unit 20 is brought from above to be fitted into the recessed groove 42 of the lower bracket 40. At the time of fitting, as illustrated in FIG. 10 and FIG. 13, the whole lower case 21 is positioned between the case stopper 44 on the right side and the case stopper 44 on the left side. Further, as illustrated in FIG. 15, the projection 24 is fitted into the rotation restricting groove 45. At the same time, as illustrated in FIG. 16, the lower flange portion 25 on the front side and the lower flange portion 25 on the rear side are fitted into the flange receiving groove 47 on the front side and the flange receiving groove 47 on the rear side, respectively. As a result, as illustrated in FIG. 16, upper end surfaces of the bush stoppers 23 of the lower case 21 and upper surfaces of the lower flange portions 25 are located to be flush with the clamping surfaces 46 of the lower bracket 40.

Figure 14:
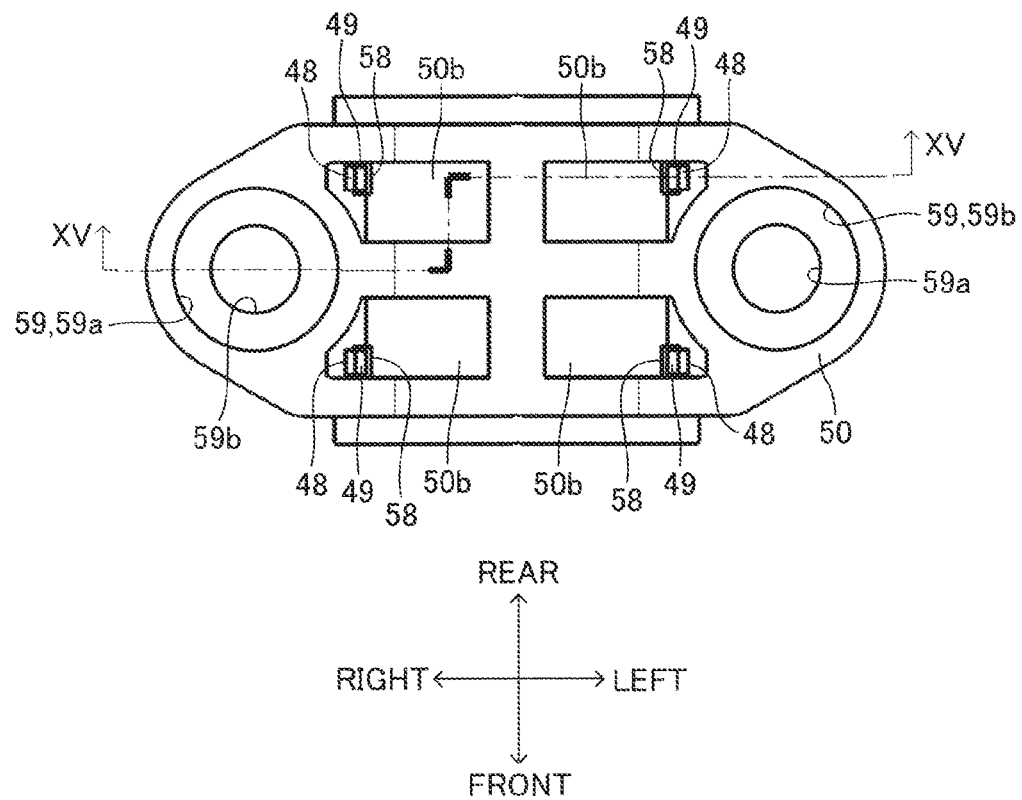
FIG. 14 is a plan view of the lower bush unit, the upper bush unit, the lower bracket, and the upper bracket according to the embodiment of the present invention, which are in the assembled state.

Further, as illustrated in FIG. 13 to FIG. 15, the elastic pieces 48 of the lower bracket 40 are inserted into the corresponding vertical grooves 58 from below. While the main body portion 41 is fitted into the lower groove 52D and the upper case 31 is fitted into the upper groove 52U, the upper bracket 50 is placed from above so as to cover the upper bush unit 30. At the time of fitting, as illustrated in FIG. 13, the whole upper case 31 is positioned between the case stopper 54 on the right side and the case stopper 44 on the left side. Further, as illustrated in FIG. 15, the projection 34 is fitted into the rotation restricting groove 55. At the same time, as illustrated in FIG. 16, the upper flange portion 35 on the front side and the upper flange portion 35 on the rear side are fitted into the flange receiving groove 57 on the front side and the flange receiving groove 57 on the rear side, respectively.

After the elastic pieces 48 are inserted into the corresponding vertical grooves 58, respectively, the engagement claws 49 of the elastic pieces 48 are brought into contact with inner peripheral surfaces of the corresponding vertical grooves 58. Thus, the elastic pieces 48 are elastically deformed. Then, after the elastic claws 49 pass upward through the vertical grooves 58, the elastic pieces 48 are elastically returned in a direction of returning to the free states, and lower surface of the engagement claws 49 are brought into contact with bottom surfaces of the corresponding lightning portions 50b, as illustrated in FIG. 13 to FIG. 15. Thus, upward removal of the upper bracket 50 from the lower bracket 40 is restricted by the elastic pieces 48.

Further, when the lower surfaces of the engagement claws 49 are brought into contact with the bottom surfaces of the lighting portions 50b, the clamping surfaces 46 of the lower bracket 40 and the clamping surfaces 56 of the upper bracket 50 are brought into surface contact with each other. Further, lower end surfaces of the bush stoppers 33 of the upper case 31 and lower surfaces of the upper flange portions 35 are located to be flush with the clamping surfaces 56 of the upper bracket 50. At this time, however, end portions of the lower bush 26 in the circumferential direction and end portions of the upper bush 36 in the circumferential direction are not brought into contact with each other. Specifically, at this time, the central angle of the arc shape of the lower bush 26 is smaller than the central angle of the arc shape of the lower case 21, and the central angle of the arc shape of the upper bush 36 is smaller than the central angle of the arc shape of the upper case 31.

Further, as illustrated in FIG. 13, the fitting protrusions 50a of the upper bracket 50 are fitted into the corresponding fitting grooves 41G of the lower bracket 40, respectively. Thus, relative movement of the upper bracket 50 relative to the lower bracket 40 in the front-and-rear direction and the right-and-left direction is restricted by the fitting grooves 41G and the fitting protrusions 50a, the main body portion 41, and the lower groove 52D.

Further, rotation of the lower case 21 about the center axis 17X of the supported portion 17 relative to the lower bracket 40 is restricted by the projection 24 and the rotation restricting groove 45. At the same time, rotation of the upper case 31 about the center axis 17X relative to the upper bracket 50 is restricted by the projection 34 and the rotation restricting groove 55. Further, rotation of the lower case 21 relative to the lower bracket 40 and rotation of the upper case 31 relative to the upper bracket 50 are restricted by the lower flange portions 25 and the upper flange portions 35.

Further, movement of the lower case 21 relative to the lower bracket 40 in the front-and-rear direction and the right-and-left direction is restricted by the lower flange portions 25 and the flange receiving portions 47. Similarly, movement of the upper case 31 relative to the upper bracket 50 in the front-and-rear direction and the right-and-left direction is restricted by the upper flange portions 35 and the flange receiving portions 57.

As illustrated in FIG. 15, the bottom surface 41D of each of the lower brackets 40 is placed on an upper surface of a stabilizer fixing portion F being part of a frame of a vehicle body. Then, bolts 60, which are inserted into the bolt holes 59 of each of the upper brackets 50 from above and pass through through holes (not shown) of the stabilizer fixing portion F, are threadably fitted into weld nuts 62 fixed to a lower surface of the stabilizer fixing portion F. Further, a head portion 61 of each of the bolts 60 is brought into contact with a lower surface of the large-diameter portion 59b corresponding thereto, Specifically, each of the supported portions 17 of the stabilizer bar 15, which are located on the right side and the left side, is fixed to the stabilizer fixing portion F through the lower bracket 40, the upper bracket 50, the bolts 60, and the welt nuts 62.

For example, when the vehicle is vibrated, each of the supported portions 17 may attempt to rotate about the center axis 17X relative to the lower bracket 40 and the upper bracket 50. At this time, however, rotation of each of the supported portions 17 about the center axis 17X relative to the lower bracket 40 and the upper bracket 50 is restricted by the projection 24 and the rotation restricting groove 45, the projection 34 and the rotation restricting groove 55, and the lower flange portions 25 and the upper flange portions 35.

The present invention is described according to the embodiment described above. The present invention is not limited to the above-mentioned embodiment, and various modifications may be made without departing from the object of the present invention.

FIG. 17 to FIG. 22 are illustrations of a stabilizer device 10A of a modification example of the present invention. In the following description of this modification example, the same configurations as those of the embodiment described above are denoted by the same reference symbols, and detailed description thereof is herein omitted.

In the stabilizer device 10A, a lower bracket 40A, which is an integrally molded member made of a resin, and a lower bush 26A made of a rubber, are integrated with each other. The lower bush 26A is manufactured of a styrene-butadiene rubber (SBR). However, the lower bush 26A may be manufactured of other rubbers such as a nitrile rubber (NBR). Specifically, the lower bush 26A having an arc-shaped cross section is vulcanized in a state of being fixed to an inner peripheral surface of the recessed groove 42 of the lower bracket 40A and inner surfaces of the pair of case stoppers 44 by insert molding that is performed under a state in which the lower bracket 40A is positioned inside a molding die (not shown). Specifically, the stabilizer device 10A of this modification example does not include the lower case 21. Thus, the lower bracket 40A and the lower bush 26A can easily and reliably be fixed to each other. The lower bracket 40A may be made of a rubber.

Figure 21:
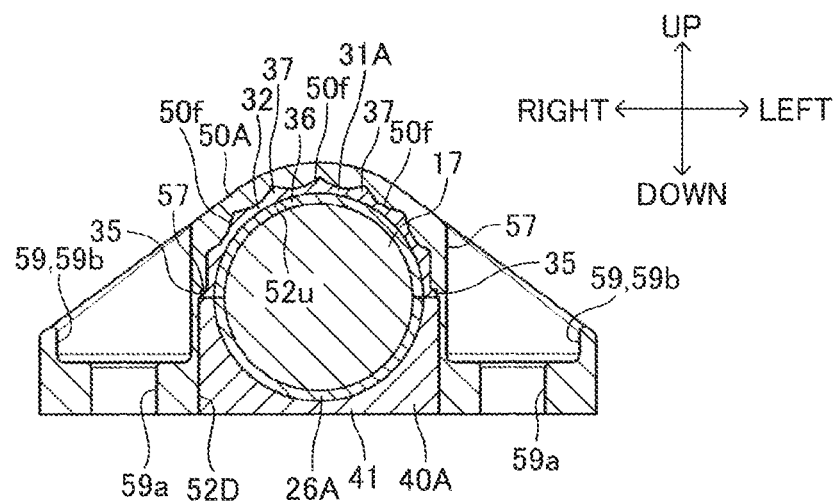
FIG. 21 is a sectional view of the lower bush, the upper bush unit, the lower bracket, and the upper bracket, which is taken along the arrow line XXI-XXI of FIG. 20.
Figure 22:
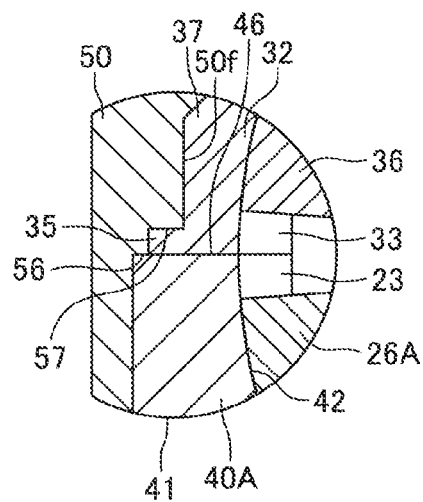
FIG. 22 is an enlarged view for illustrating part of FIG. 21.
Figure 23:
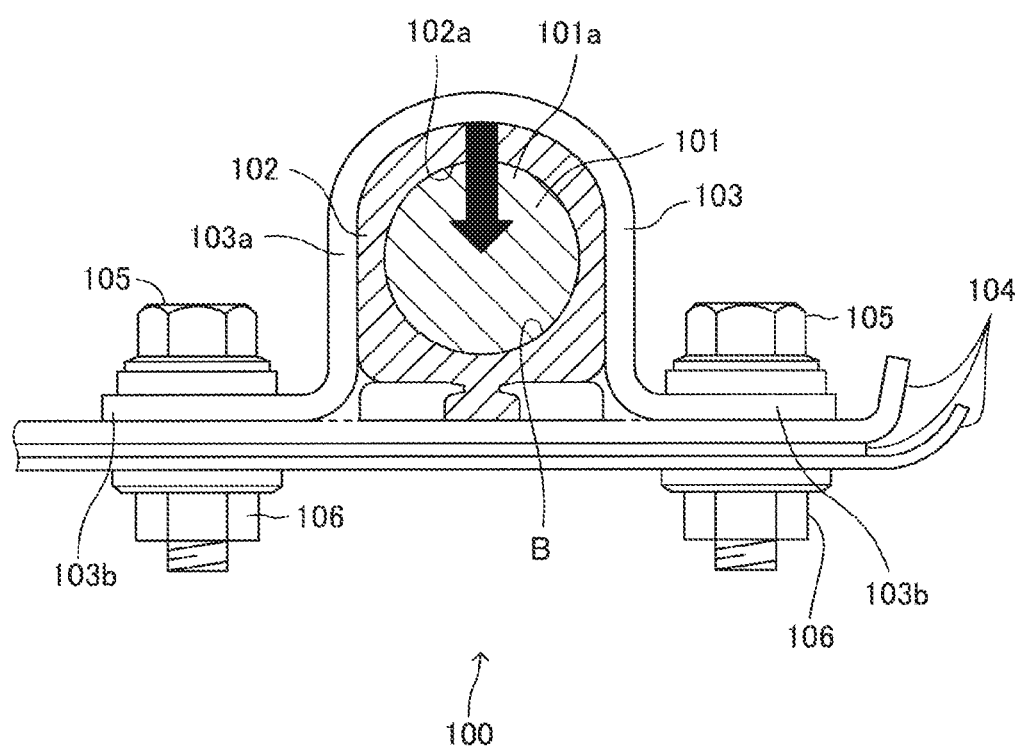
FIG. 23 is a sectional view of a stabilizer device of a comparative example.

Further, an inner diameter of the recessed groove 42 of the lower bracket 40A is approximately the same as an inner diameter of the main body portion 22 of the lower case 21 under a state illustrated in FIG. 9. Further, the rotation restricting groove 45 is not formed in the inner peripheral surface 43 of the recessed groove 42. Further, as illustrated in FIG. 21 and FIG. 22, a central angle of an arc shape of the lower bush 26A is slightly smaller than a central angle of an arc shape of the inner peripheral surface 43.

Figure 17:
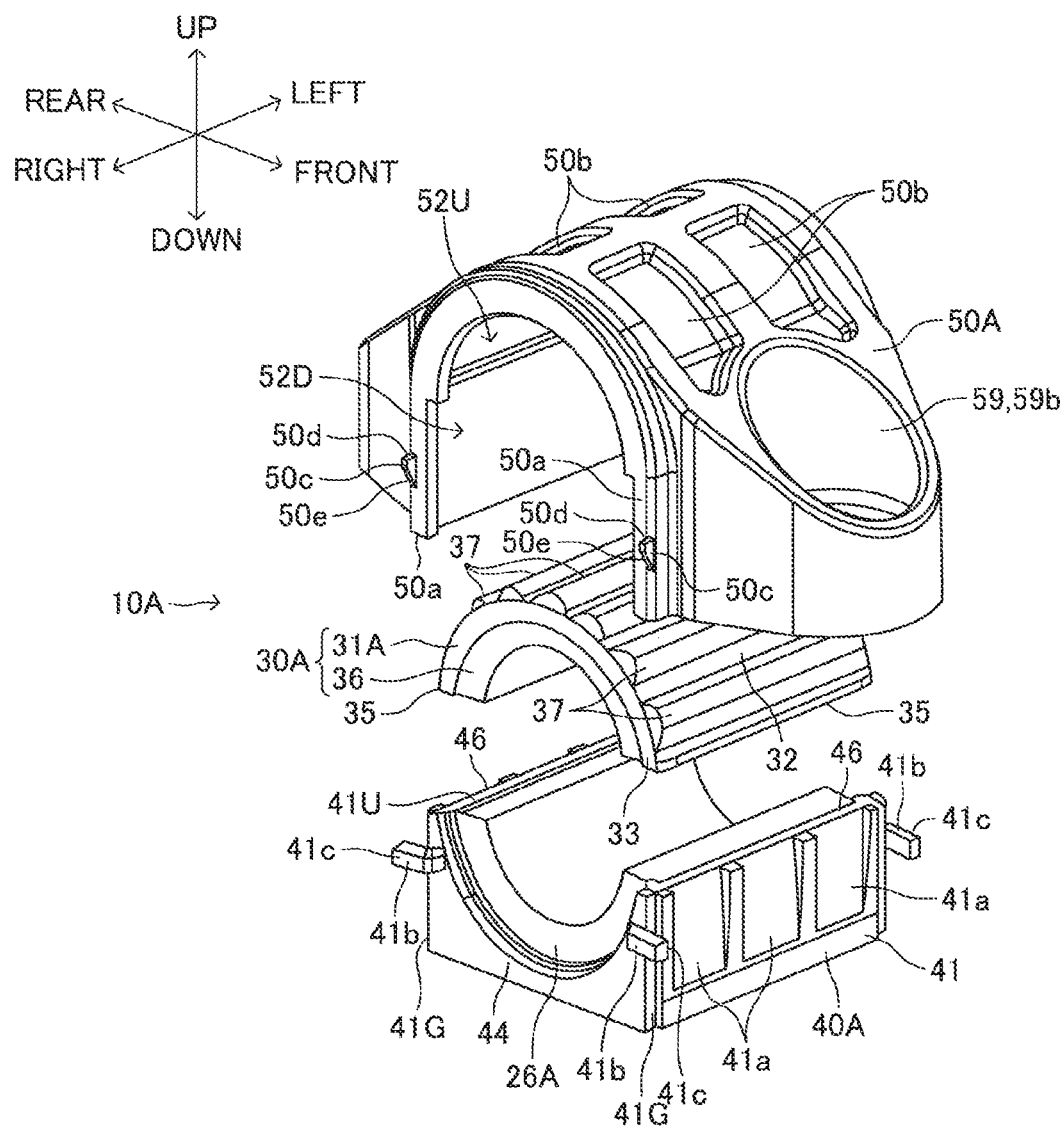
FIG. 17 is an exploded perspective view of a lower bush, an upper bush unit, a lower bracket, and an upper bracket of a modification example of the present invention.

As illustrated in FIG. 17, three lightning portions 41a are formed in each of a front surface and a rear surface of the main body portion 41 of the lower bracket 40A. With the formation of the lightning portions 41a in the main body portion 41, the lower bracket 40A of this modification example is more lightweight than the lower bracket 40 of the embodiment described above.

Further, a pair of front and rear elastic engagement pieces 41b is formed on each of a right side surface and a left side surface of the main body portion 41. A shape of a side surface of each of the elastic engagement pieces 41b is rectangular, and an outer end portion of each of the elastic engagement pieces 41b serves as an engagement portion 41c located on an outer side of the main body portion 41 in side view.

Figure 18:
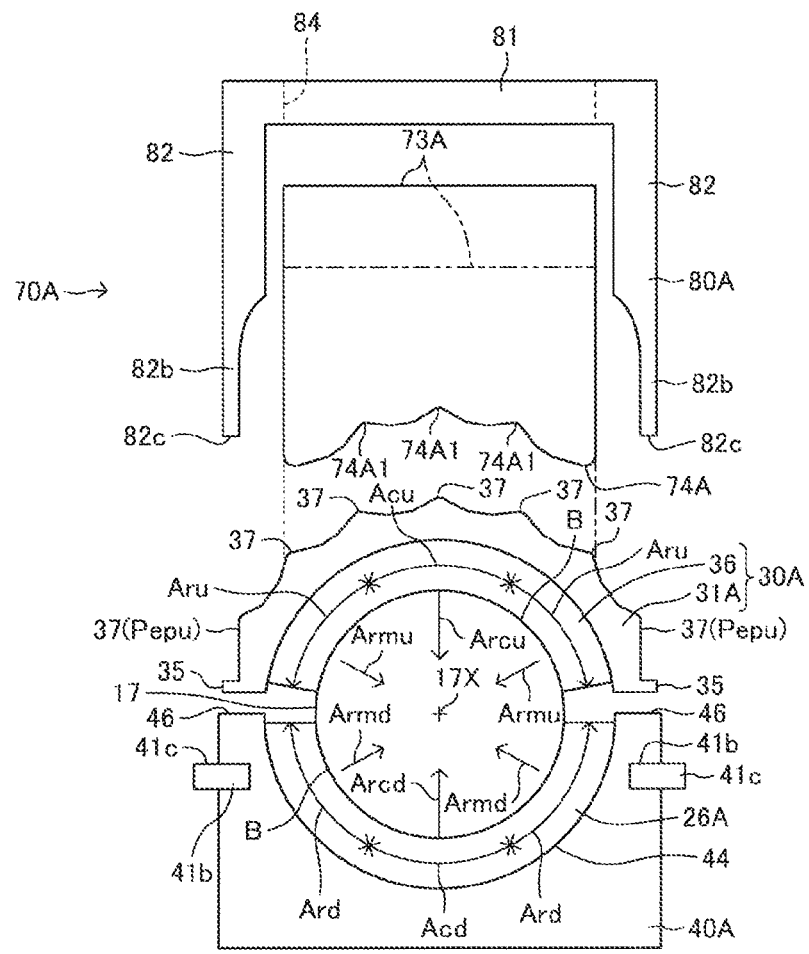
FIG. 18 is a side view of the modification example of the present invention, which corresponds to FIG. 6.

As illustrated in FIG. 17 to FIG. 19 and FIG. 21, an upper bush unit 30A includes an upper case 31A and the upper bush 36. The upper case 31A is made of a resin, and is manufactured of polyacetal (POM) or polyamide (PA). However, other materials may be used. The upper bush 36 is vulcanized in a state of being fixed to the inner peripheral surface of the main body portion 32 and the inner surfaces of the right and left bush stoppers 33 by insert molding that is performed under a state in which the upper case 31A is positioned inside a molding die (not shown). A plurality of projections 37 are formed on the outer peripheral surface of the main body portion 32 of the upper case 31A so as to be arranged side by side in the circumferential direction. Each of the projections 37 has an approximately triangular prism shape. As illustrated in FIG. 18, after the upper bush 36 is obtained by molding, the central angle of the arc shape of the upper bush 36 is smaller than a central angle of the upper case 31A.

Figure 19:
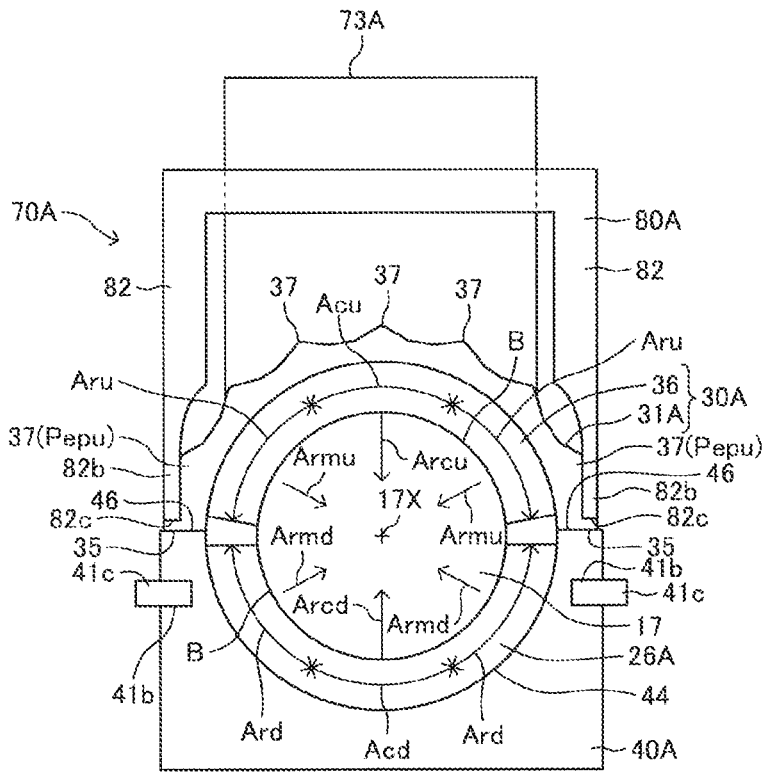
FIG. 19 is a side view of the modification example of the present invention, which corresponds to FIG. 9.

As illustrated in FIG. 18, an inner peripheral surface of the lower bush 26A is mounted to the lower half of the outer peripheral surface of the supported portion 17, which is heated to a predetermined temperature, through the adhesive B applied onto the entire inner peripheral surface of the lower bush 26A. At the same time, the inner peripheral surface of the upper bush 36 is mounted to the upper half of the outer peripheral surface of the supported portion 17 through the adhesive B applied onto the entire inner peripheral surface of the upper bush 36. At the time of mounting, as illustrated in FIG. 18, a position of the lower bush 26A and a position of the upper bush 36 in the circumferential direction of the supported portion 17 are shifted from each other by 180 degrees or about 180 degrees. Thus, the clamping surfaces 46 of the lower bracket 40A and the upper flange portions 35 of the upper case 31A become parallel to each other. The lower bracket 40A is placed on a work table (not shown). A pressing device 70A illustrated in FIG. 18 and FIG. 19 is provided immediately above the work table.

The pressing device 70A includes a first upper pressing member 73A and a second upper pressing member 80A. In other words, the pressing device 70A does not include the first lower pressing member 71 and the second lower pressing member 75. A lower surface of the first upper pressing member 73A serves as a contact surface 74A having a plurality of fitting grooves 74A1, each having a shape corresponding to a shape of each of the projections 37. A lower end portion of each of the pressing pieces 82 of the second upper pressing member 80A corresponds to a pressing portion 82b having a small width, and a lower end surface of the pressing portion 82b corresponds to a pressing surface 82c, which is a horizontal surface.

When the lower bush 26A and the upper bush 36 are fixed to the supported portion 17 through the adhesive B, the first upper pressing member 73A is positioned in advance at an initial position indicated by the solid line in FIG. 18 by the first actuator, and the second upper pressing member 80A is positioned at an initial position illustrated in FIG. 18 by the second actuator.

Subsequently, the first upper pressing member 73A is moved to a clamping position indicated by the imaginary line in FIG. 18 by the first actuator, and the first upper pressing member 73A is kept in the clamping position. Then, the fitting grooves 74A1 of the first upper pressing member 73A are fitted over the corresponding projections 37 of the upper case 31A, and the contact surface 74A is brought into contact with a central portion of the upper case 31A in the circumferential direction. Then, a downward force indicated by the arrow Arcu is exerted from the contact surface 74A to the central portion of the upper case 31A in the circumferential direction. Thus, the central portion Acu of the inner peripheral surface of the upper bush 36 in the circumferential direction is pressed against the upper end portion of the outer peripheral surface of the supported portion 17 and the vicinity thereof by the force in the direction indicated by the arrow Arcu. Further, due to the force in the direction indicated by the arrow Arcu, the central portion Acd of the inner peripheral surface of the lower bush 26A in the circumferential direction is pressed against the lower end portion of the outer peripheral surface of the supported portion 17 and the vicinity thereof by the force in the direction indicated by the arrow Arcd.

Subsequently, under a state in which the first upper pressing member 73A is kept in the clamping position, the second upper pressing member 80A, which has been positioned in the initial position, is lowered by the second actuator. Then, although not shown, the pair of pressing surfaces 82c of the second upper pressing member 80A is brought into contact with upper surfaces of the pair of upper flange portions 35 of the upper case 31A.

Further, the second upper pressing member 80A is lowered to a pressing completion position illustrated in FIG. 19 and is kept in the pressing completion position by the second actuator. Then, the pair of pressing surface 82c of the second upper pressing member 80A presses the upper flange portions 35 corresponding thereto. Thus, forces in the directions indicated by the arrows Armu and forces in the directions approximately parallel to the directions indicated by the arrows Armu are generated at the two end vicinity portions Pepu of the upper case 31A, specifically, the two projections 37 positioned at both end portions of the upper case 31A in the circumferential direction. As a result, a curvature of the upper case 31A and the curvature of the upper bush 36 become larger than those in a case illustrated in FIG. 18. Then, the lower surfaces of the upper flange portions 35 are brought into contact with the clamping surfaces 46 of the lower bracket 40A. Further, the upper bush 36 is elastically deformed in a direction of increasing a circumferential length thereof as compared to that under the state illustrated in FIG. 18. However, the central angle of the arc shape of the upper bush 36 is smaller than the central angle of the upper case 31A in the initial state before being pressed by the pressing device 70A. Thus, end portions of the upper bush 36 in the circumferential direction, which has been elastically deformed as illustrated in FIG. 19, are not brought into contact with end portions of the lower bush 26A in the circumferential direction. Specifically, contact between the clamping surfaces 46 and the upper flange portions 35 is not hindered by the lower bush 26A and the upper bush 36.

Then, the pair of remaining regions Aru of the upper bush 36 is pressed against the outer peripheral surface of the supported portion 17 by the forces in the directions indicated by the arrows Armu and the forces in the directions approximately parallel to the directions indicated by the arrows Armu. Further, due to the forces indicated by the arrows Armu and the forces in the direction approximately parallel to the directions indicated by the arrows Armu, the pair of remaining regions Ard of the inner peripheral surface of the lower bush 26A is pressed against the outer peripheral surface of the supported portion 17 by the forces in the directions indicated by the arrows Armd and the forces in the directions approximately parallel to the directions indicated by the arrows Armd.

Thus, when the first upper pressing member 73A is kept in the clamping position by the first actuator and the second upper pressing member 80A is kept in the pressing completion position by the second actuator until the adhesive B is hardened, the central portion Acu and the two remaining regions Aru of the upper bush 36 are firmly fixed to the outer peripheral surface of the supported portion 17 through the adhesive B. Further, the central portion Acd and the two remaining regions Ard of the lower bush 26A are firmly fixed to the outer peripheral surface of the supported portion 17 through the adhesive B.

After elapse of sufficient time to harden the adhesive B, the first upper pressing member 73A and the second upper pressing member 80A are returned to the initial positions by the first actuator and the second actuator, respectively. Then, a worker extracts the stabilizer bar 15, the lower bush unit 26A, the lower bracket 40A and the upper bush unit 30A, which are integrated with each other, from the pressing device 70A. Then, the upper case 31A attempt to elastically return to initial shapes. Therefore, the curvature of the upper case 31A become slightly smaller than the curvatures thereof under the state illustrated in FIG. 19. At the same time, minute gaps are formed between the upper flange portions 35 and the clamping surface 46 corresponding thereto.

Figure 20:
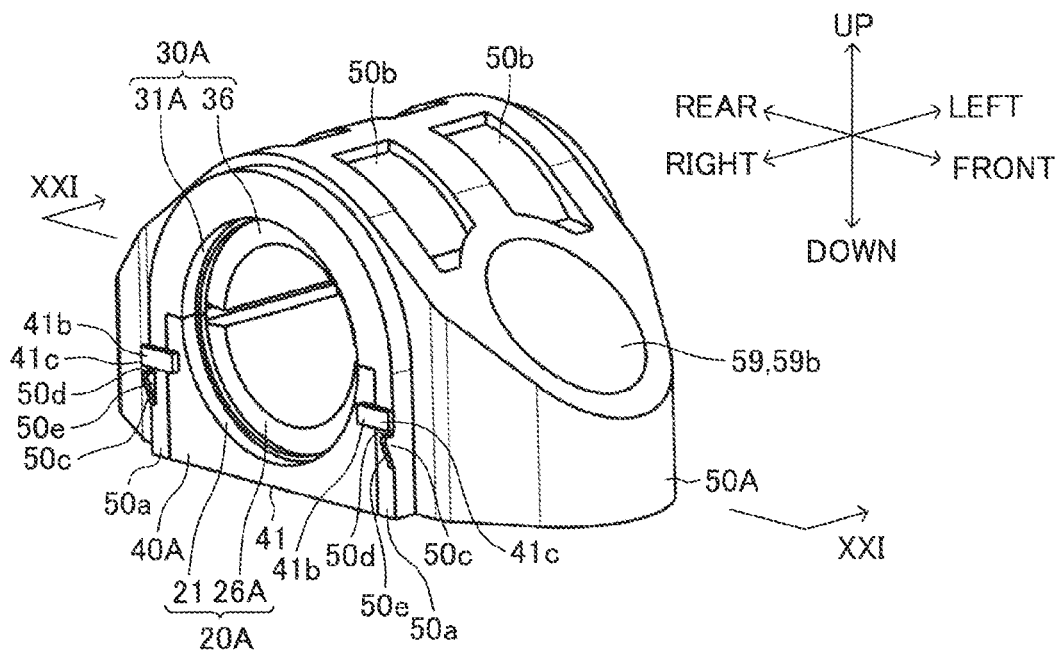
FIG. 20 is a perspective view of the lower bush, the upper bush unit, the lower bracket, and the upper bracket according to the modification example of the present invention, which are in an assembled state.

As illustrated in FIG. 17 and FIG. 20, an engaged projection 50c is formed on each of the fitting projections 50a of the upper bracket 50A, which is the integrally molded member made of a resin. An upper surface of the engaged projection 50c serves as an engaged surface 50d, which is a horizontal surface. A right side surface of each of the engaged projections 50c on the right side is an inclined guide surface 50e that is inclined downward from the right side to the left side. Although not shown, a left side surface of each of the engaged projections 50c on the left side is the inclined guide surface 50e that is inclined downward from the left side to the right side. The upper bracket 50A does not have the vertical grooves 58. The upper bracket 50A may be made of a rubber.

As illustrated in FIG. 21, a plurality of recessed grooves 50f, each having a shape corresponding to the shape of each of the projections 37, are formed on an inner peripheral surface of the upper groove 52U of the upper bracket 50A of this modification example.

As illustrated in FIG. 20, when the upper bracket 50A is mounted to the upper bush 26A, the lower bracket 40A, and the upper bush unit 30A from above, the engagement portions 41c of the elastic engagement pieces 41b of the lower bracket 40A are brought into contact with the inclined guide surfaces 50e of the engaged projections 50c corresponding thereto and slide upward on the inclined guide surfaces 50e corresponding thereto while being elastically deformed. Then, when the upper bracket 50A is completely mounted to the lower bracket 40A and the upper bush unit 30A, the engagement portions 41c pass over the engaged projections 50c corresponding thereto and are brought into engagement with the engaged surfaces 50d from above. Thus, upward removal of the upper bracket 50A from the lower bracket 40A is restricted by the elastic engagement pieces 41b and the engaged projections 50d.

Further, as illustrated in FIG. 21, the plurality of projections 37 are fitted to the recessed grooves 50f corresponding thereto.

Further, as illustrated in FIG. 22, the clamping surfaces 46 of the lower bracket 40A and the clamping surfaces 56 of the upper bracket 50 are brought into surface contact with each other. Further, lower end surfaces of the bush stoppers 33 of the upper case 31A and lower surfaces of the upper flange portions 35 are located to be flush with the clamping surfaces 56 of the upper bracket 50A. Then, the upper end surfaces of the bush stoppers 23 and the lower end surfaces of the bush stoppers 33 are brought into surface contact with each other, and the lower surfaces of the upper flange portions 35 and the clamping surfaces 56 are brought into surface contact with the clamping surfaces 46.

As described above, in this modification example, relative rotation between the lower bush 26A and the lower bracket 40A is completely restricted, and the plurality of projections 37 are fitted into the recessed grooves 50f corresponding thereto. Thus, when vibrations occurs in the vehicle, a fear of rotation of each of the supported portions 17 about the center axis 17X relative to the lower bracket 40A and the upper bracket 50A is smaller than that in the embodiment described above.

The lower bush unit 20 and the lower bracket 40 of the embodiment described above may be fixed with use of an adhesive. In this case, the projection 24 and the rotation restricting groove 45 may be omitted.

The upper bush unit 30 and the upper bracket 50 of the embodiment described above may be fixed with use of an adhesive. In this case, the projection 34 and the rotation restricting groove 55 may be omitted.

The upper bush unit 30A and the upper bracket 50A of the modification example described above may be fixed with use of an adhesive. In this case, the projection 37 and the rotation restricting groove 50f may be omitted.

A portion corresponding to the upper case 31A and the upper bracket 50A may be formed as an integrally molded member made of a resin or a rubber, and the upper bush 36 may be vulcanized by insert molding that is performed under a state in which the integrally molded member is positioned inside a molding die (not shown). In this case, however, the stabilizer device is required to include the lower bush unit 20 and the lower bracket 40.

The lower flange portions 25 may be omitted from the lower case 21 of the lower bush unit 20, and the upper flange portions 35 may be omitted from the upper case 31 of the upper bush unit 30. In this case, the flange receiving grooves 47 are omitted from the main body portion 41 of the lower bracket 40, and the flange receiving grooves 57 are omitted from the upper bracket 50. Similarly, the upper flange portions 35 may be omitted from the upper case 31 of the upper bush unit 30A. In this case, the flange receiving grooves 57 are omitted from the upper bracket 50A, In the above-mentioned cases, with a change in shape of each of the pressing pieces 77 and 82, after the second lower pressing member 75 and/or the second upper pressing member 80, 80A is moved to the pressing completion position, the pressing pieces 77 and 82 are brought into contact with the end vicinity portions Pepu and Pepd corresponding thereto. Then, the forces in the directions indicated by the arrows Armu and the forces in the directions approximately parallel to the directions indicated by the arrows Armu are generated in the remaining regions Aru, and the forces in the directions indicated by the arrows Armd and the forces in the directions approximately parallel to the directions indicated by the arrows Armd are generated in the remaining regions Ard. Thus, even in the above-mentioned cases, the remaining regions Aru and Ard are firmly fixed to the outer peripheral surface of the supported portion 17 through the adhesive B.

The lower bush 26, 26A and/or the upper bush 36 may be manufactured of an elastic material other than a rubber.

The lower case 21 and/or the upper case 31, and the upper case 31A may be manufactured of a rubber (for example, a hard rubber).

What is claimed is:

1. A stabilizer device, comprising:
a pair of bushes made of an elastic material, the pair of bushes having inner peripheral surfaces fixed at two different positions on a cylindrical outer peripheral surface of a stabilizer bar in a circumferential direction of the stabilizer bar, the pair of bushes each having an arc sectional shape and being formed as members independent of each other;
at least one case made of one of a resin and a rubber, the at least one case having an inner peripheral surface fixed to an outer peripheral surface of a corresponding one of the bushes and having an arc sectional shape; and
a pair of bush stoppers formed on the inner peripheral surface of the at least one case so as to be separate from each other in a direction parallel to a center axis of the stabilizer bar, wherein
the pair of bush stoppers are provided on both end portions of the inner peripheral surface of the at least one case, and each have an arc shape, and
the corresponding one of the bushes is positioned between the pair of bush stoppers formed on the inner peripheral surface of the at least one case.

2. The stabilizer device according to claim 1, further comprising a pair of pressed projections to be pressed by a pressing member, which are formed on both sides of a central portion of an outer peripheral surface of the at least one case in the circumferential direction of the stabilizer bar so as to project radially outer side.

3. The stabilizer device according to claim 1, further comprising a pair of brackets to be fixed to a vehicle body under a state of being fixed to each other, each of the pair of brackets corresponding to the bushes, a corresponding one of the brackets being mounted to an outer peripheral surface of the at least one case, wherein a recessed portion is formed on an inner peripheral surface of the corresponding one of the brackets, which is mounted to the outer peripheral surface of the at least one case, and wherein a projecting portion to be fitted into the recessed portion is formed on the outer peripheral surface of the at least one case to which the corresponding one of the brackets is mounted.

4. The stabilizer device according to claim 3, wherein the corresponding one of the brackets is mounted to the outer peripheral surface of the case fixed to the corresponding one of the bushes, and another one of the brackets is directly fixed to another one of the bushes.

5. The stabilized device according to claim 4, wherein the another one of the brackets is made of one of a resin and a rubber.

6. A method of manufacturing a stabilizer device, comprising:

preparing at least one case made of one of a resin and a rubber, the at least one case having an arc sectional shape and having a smaller curvature than a curvature of a cylindrical outer peripheral surface of a stabilizer bar;

forming a pair of bushes made of an elastic material, each of the pair of bushes having an arc-shaped sectional shape and being formed as members independent of each other so that an outer peripheral surface of a corresponding one of the bushes is fixed to an inner peripheral surface of the case;

mounting inner peripheral surfaces of the pair of bushes to the outer peripheral surface of the stabilizer bar through an adhesive so that positions of the pair of bushes in a circumferential direction of the stabilizer bar are shifted from each other;

pressing a central portion of the at least one case in the circumferential direction of the stabilizer bar with the use of a first pressing member in a direction of being brought closer to a center axis of the stabilizer bar; and when the central portion of the at least one case is pressed with the first pressing member in the circumferential direction of the stabilizer bar, moving a second pressing member brought into contact with two pressed portions being regions located on both sides of the central portion of the case in the circumferential direction of the stabilizer bar so as to be brought closer to the center axis of the stabilizer bar along a direction parallel to a direction of movement of the first pressing member to deform the two pressed portions to an radially inner side.

\* \* \* \* \*